US011339724B2

(12) United States Patent
Di Giovanni et al.

(10) Patent No.: US 11,339,724 B2
(45) Date of Patent: May 24, 2022

(54) DEFLECTOR FOR A MECHANICAL REDUCTION GEAR OF AN AIRCRAFT TURBINE ENGINE

(71) Applicant: SAFRAN TRANSMISSION SYSTEMS, Colombes (FR)

(72) Inventors: Jean-Charles Michel Pierre Di Giovanni, Moissy-Cramayel (FR); Adrien Louis Simon, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 326 days.

(21) Appl. No.: 16/691,504

(22) Filed: Nov. 21, 2019

(65) Prior Publication Data

US 2020/0166118 A1 May 28, 2020

(30) Foreign Application Priority Data

Nov. 23, 2018 (FR) ...................... 1871750

(51) Int. Cl.
*F16H 57/04* (2010.01)
*F02C 7/36* (2006.01)
(Continued)

(52) U.S. Cl.
CPC ............. *F02C 7/36* (2013.01); *F01D 25/18* (2013.01); *F16H 57/0456* (2013.01);
(Continued)

(58) Field of Classification Search
CPC ............ F16H 57/082; F16H 57/0479; F16H 57/0486; F16H 57/0456; F05D 2260/98; F01D 25/18
See application file for complete search history.

(56) References Cited

U.S. PATENT DOCUMENTS 8,820,478 B2   9/2014 Gauthier et al.
8,876,647 B2  11/2014 Gallet et al.
(Continued)

FOREIGN PATENT DOCUMENTS

EP   3 473 892 A1   4/2019
FR   2 568 340 A1   1/1986
(Continued)

OTHER PUBLICATIONS

French Search Report dated Jul. 16, 2019, for French Application No. 1871750, filed Nov. 23, 2018, 2 pages.

*Primary Examiner* — Erin D Bishop
(74) *Attorney, Agent, or Firm* — Christensen O'Connor Johnson Kindness PLLC

(57) ABSTRACT

A deflector for a mechanical reduction gear of a turbine engine, for example of an aircraft, is configured to be inserted between two adjacent planets of the reduction gear. The deflector includes a block having a first lateral surface that is cylindrical and concave and has a radius of curvature R1 measured from an axis G1. The block also has a second lateral surface, opposite the first lateral surface, that is cylindrical and concave and that has a radius of curvature R1 measured from an axis G2 that is parallel to G1. Each of the first and second surfaces has at least one protruding tab having a generally elongate shape about the respective axis G1, G2 of the surface considered and having an internal periphery that is concavely curved and a has radius of curvature R2 measured from the respective axis G1, G2, R2 being less than R1.

11 Claims, 23 Drawing Sheets

(51) Int. Cl.
*F01D 25/18* (2006.01)
*F16H 57/08* (2006.01)

(52) U.S. Cl.
CPC ..... *F16H 57/0479* (2013.01); *F16H 57/0486* (2013.01); *F16H 57/082* (2013.01); *F05D 2260/40311* (2013.01); *F05D 2260/98* (2013.01); *F16H 57/0471* (2013.01); *F16H 2057/085* (2013.01)

(56) References Cited

U.S. PATENT DOCUMENTS

| | | | |
|---|---|---|---|
| 9,291,255 B2* | 3/2016 | Imai | F16H 57/0427 |
| 9,810,312 B2* | 11/2017 | Obayashi | F16H 57/0427 |
| 10,267,232 B2* | 4/2019 | McCune | F02C 7/06 |
| 10,458,279 B2 | 10/2019 | Gedin et al. | |
| 10,823,083 B2* | 11/2020 | Gravina | F02C 7/36 |
| 10,859,155 B2* | 12/2020 | Clark | F16H 57/0482 |
| 2016/0146102 A1 | 5/2016 | McCune et al. | |

FOREIGN PATENT DOCUMENTS

| | | |
|---|---|---|
| FR | 2 987 416 A1 | 8/2013 |
| FR | 3 041 054 A1 | 3/2017 |
| WO | 2010/092263 A1 | 8/2010 |
| WO | 2014/123704 A1 | 8/2014 |

\* cited by examiner

[Fig. 1]
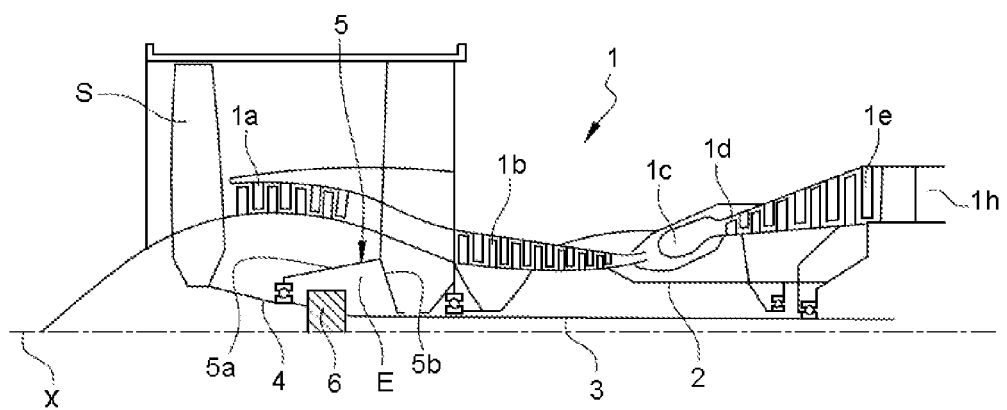

[Fig. 2]
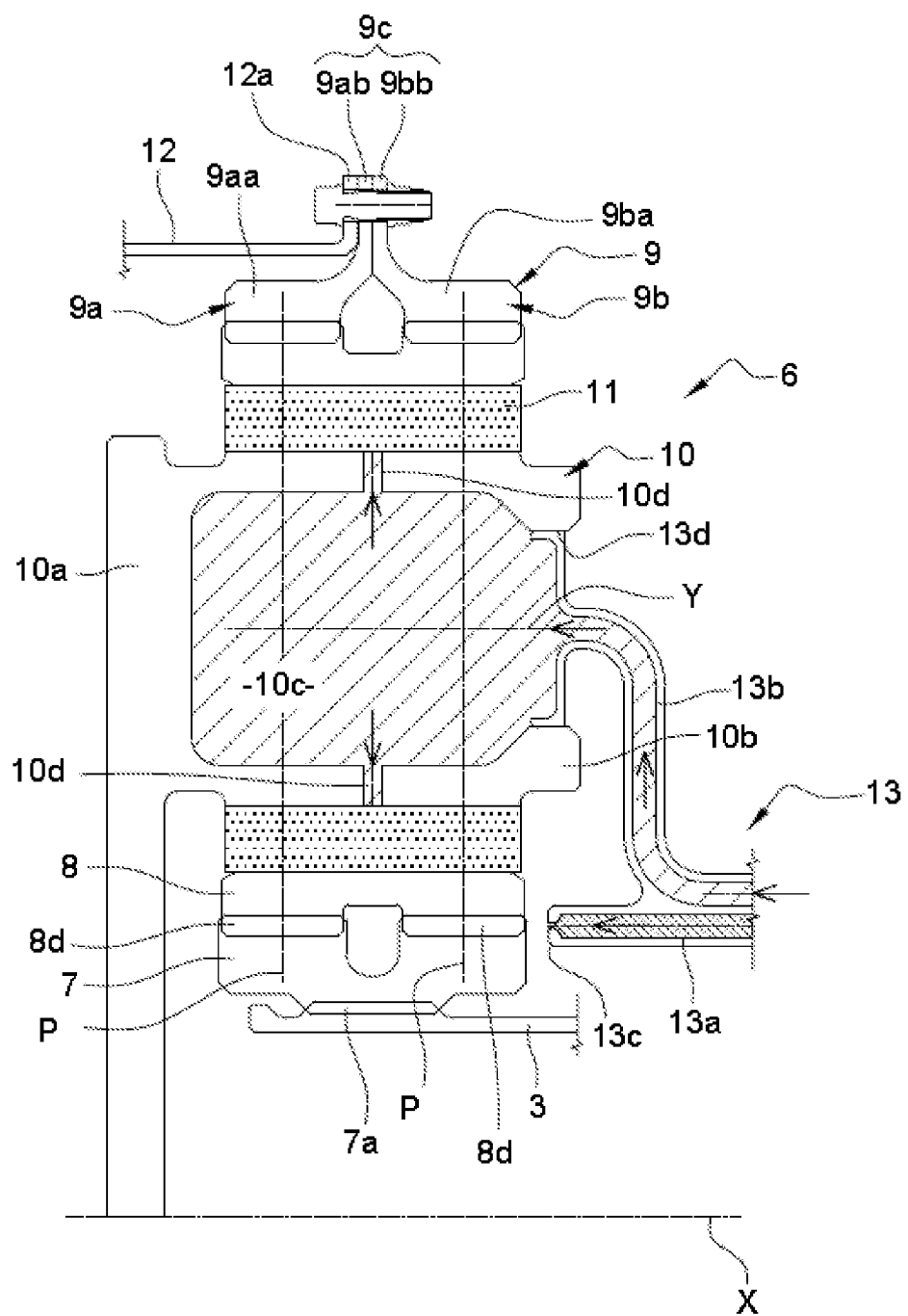

[Fig. 3]
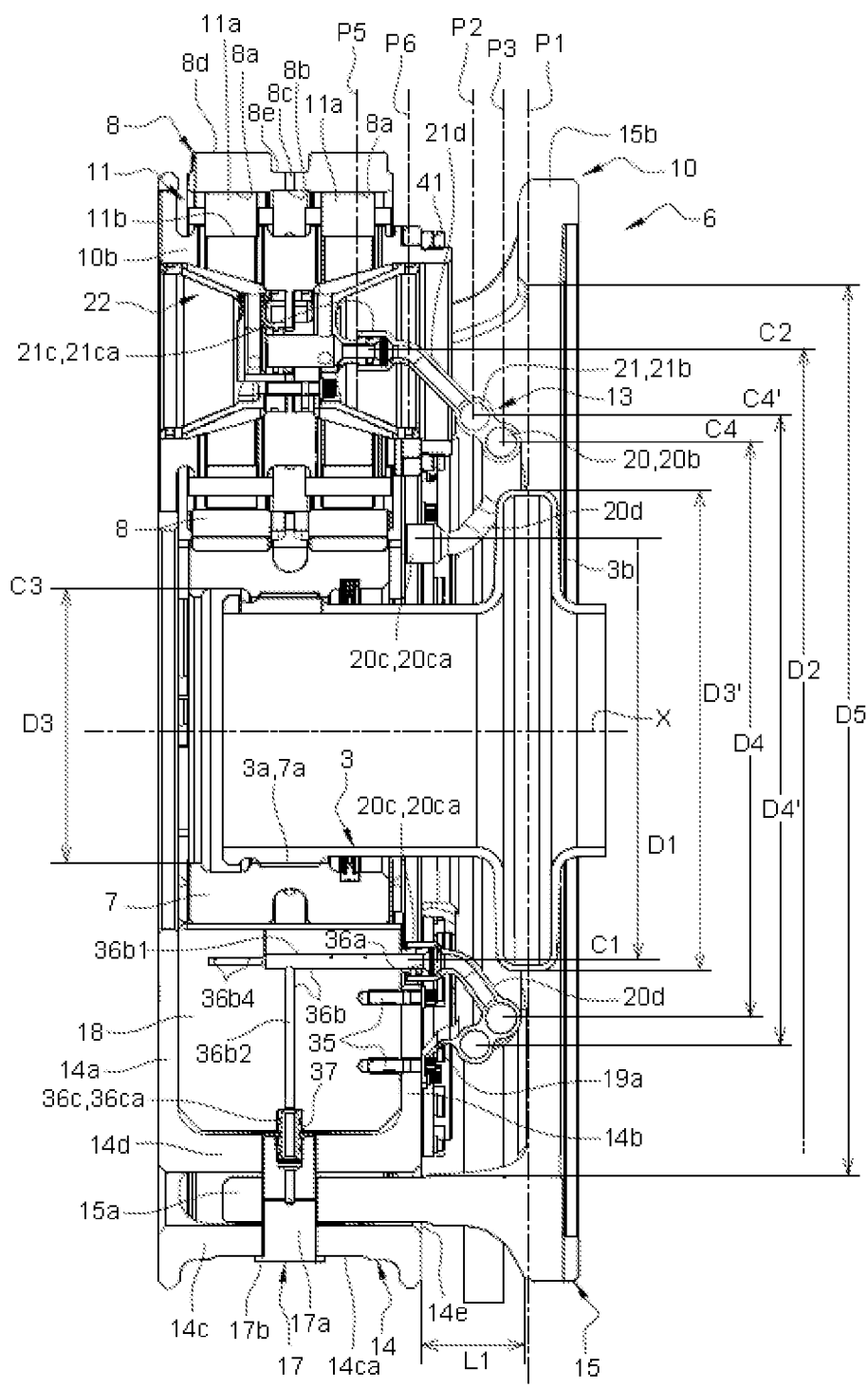

[Fig. 4]
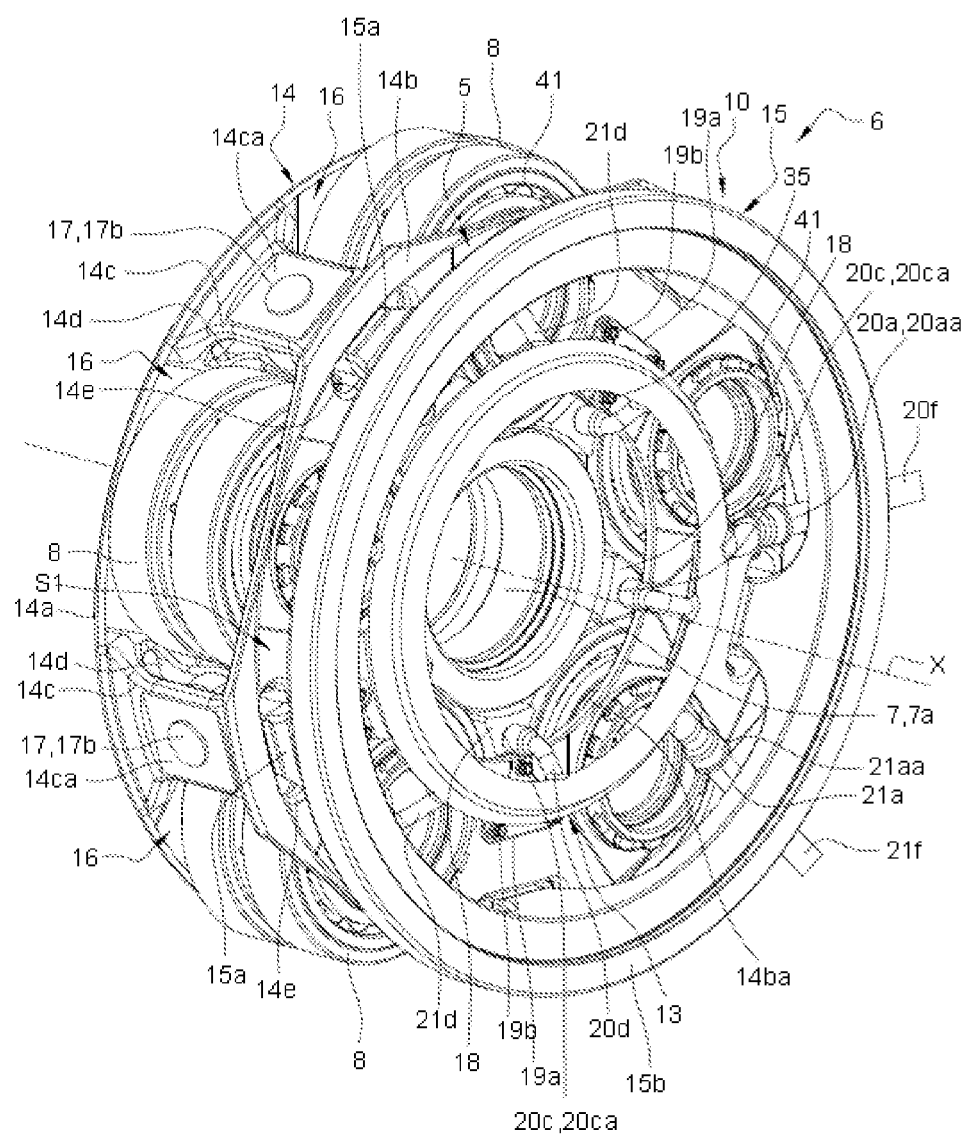

[Fig. 5]
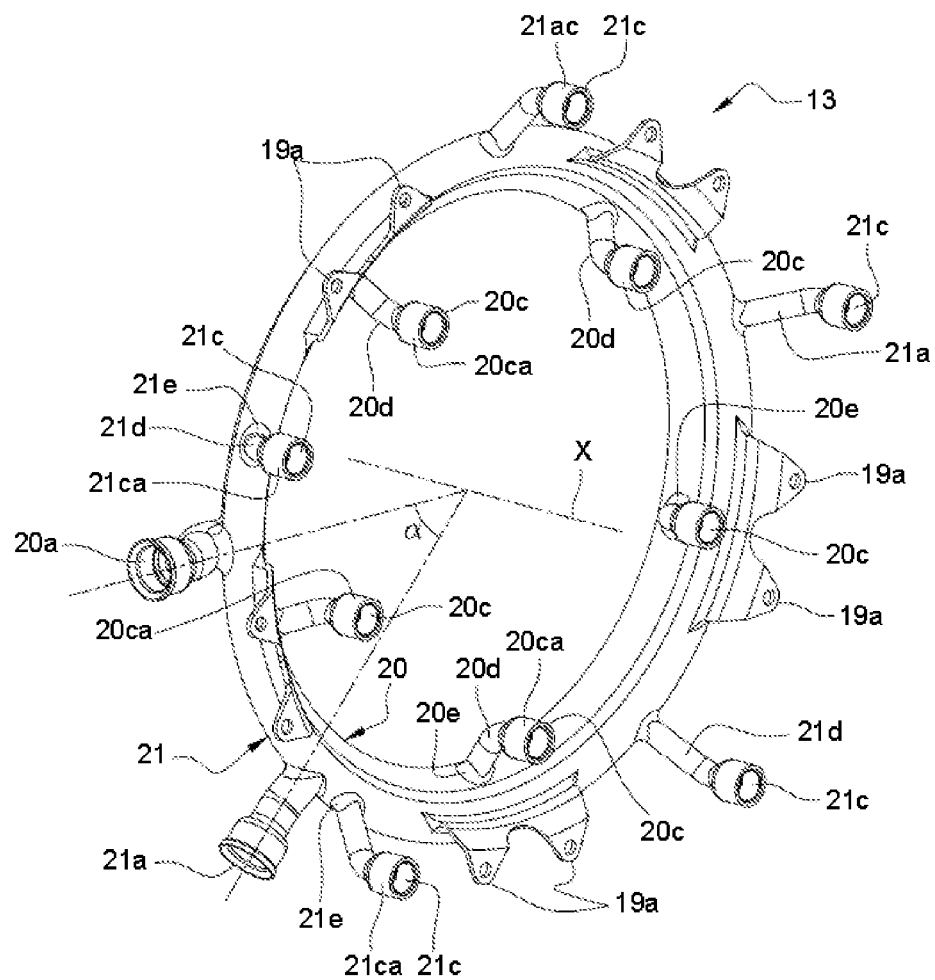

[Fig. 6]
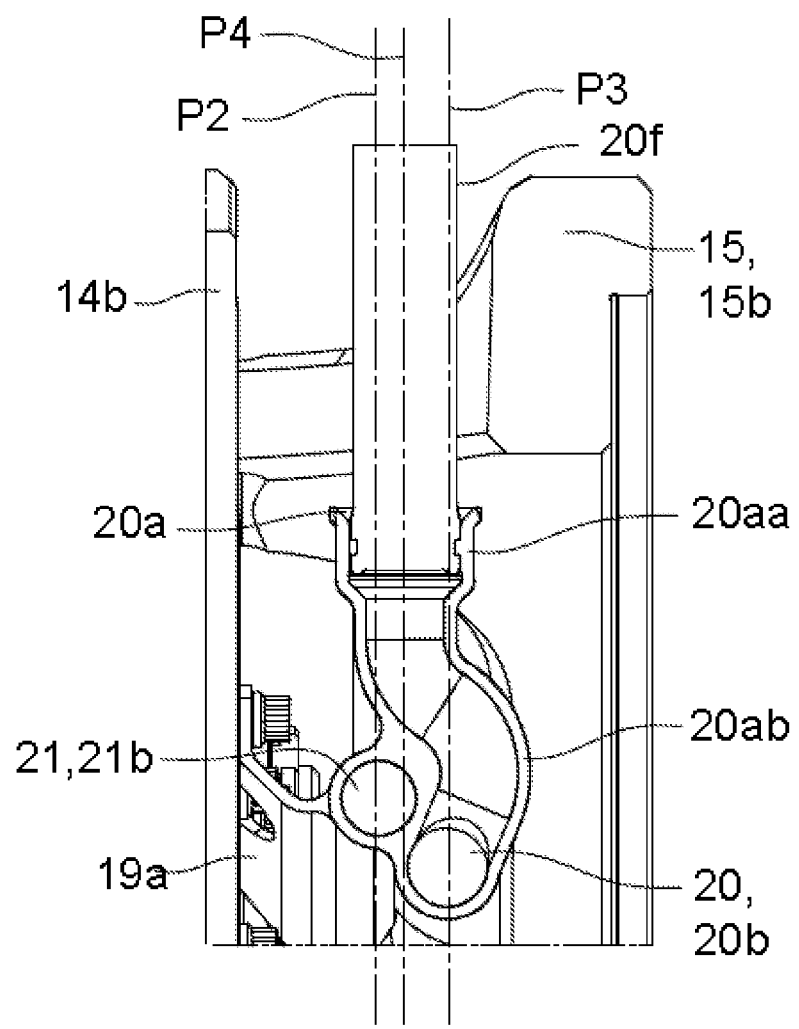

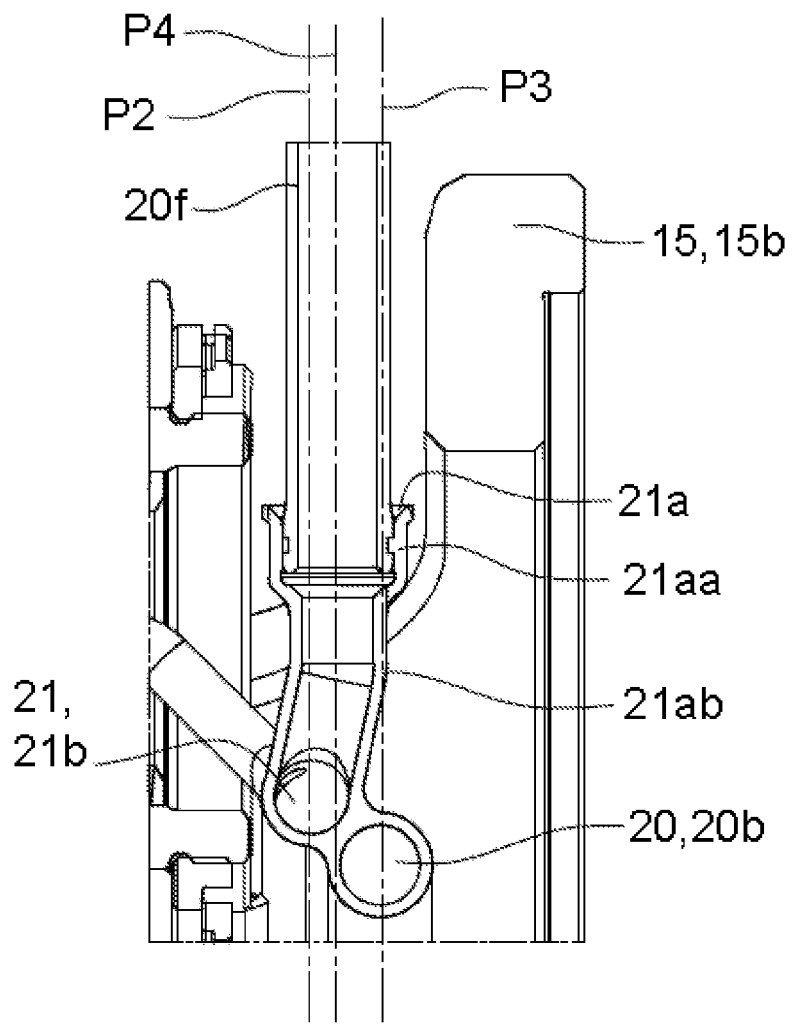
[Fig. 7]

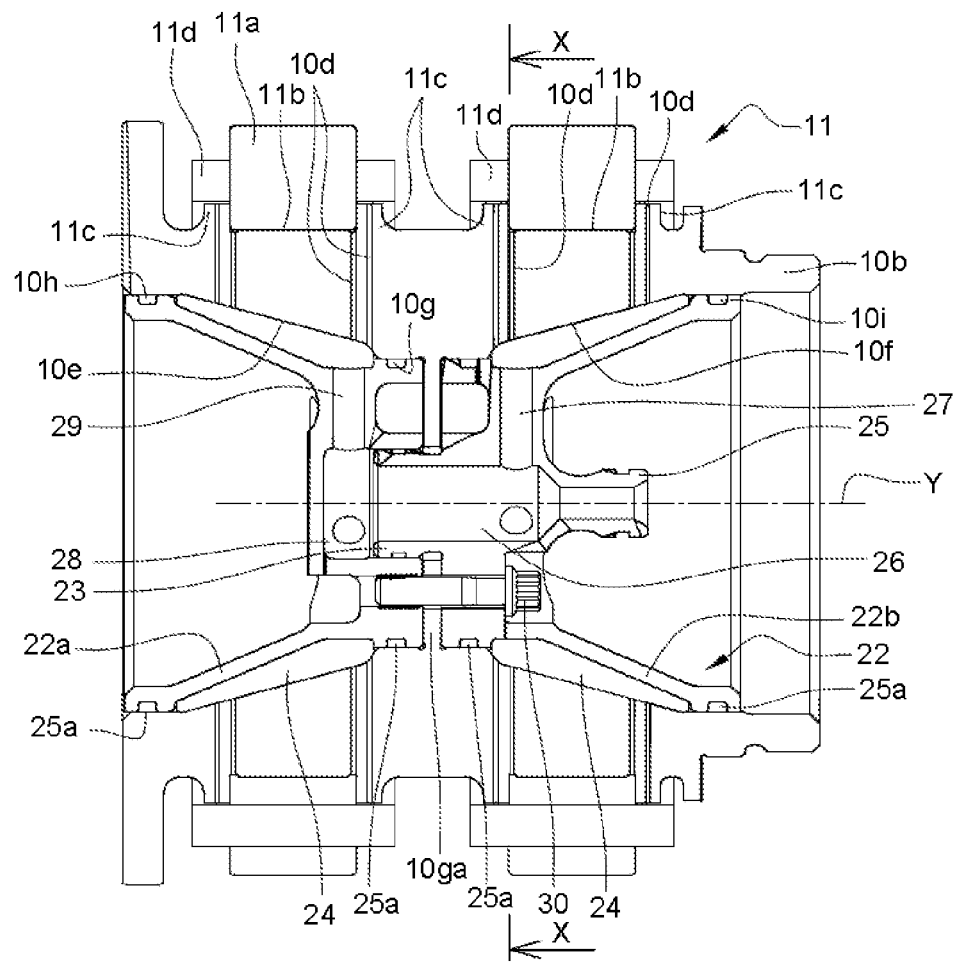
[Fig. 8]

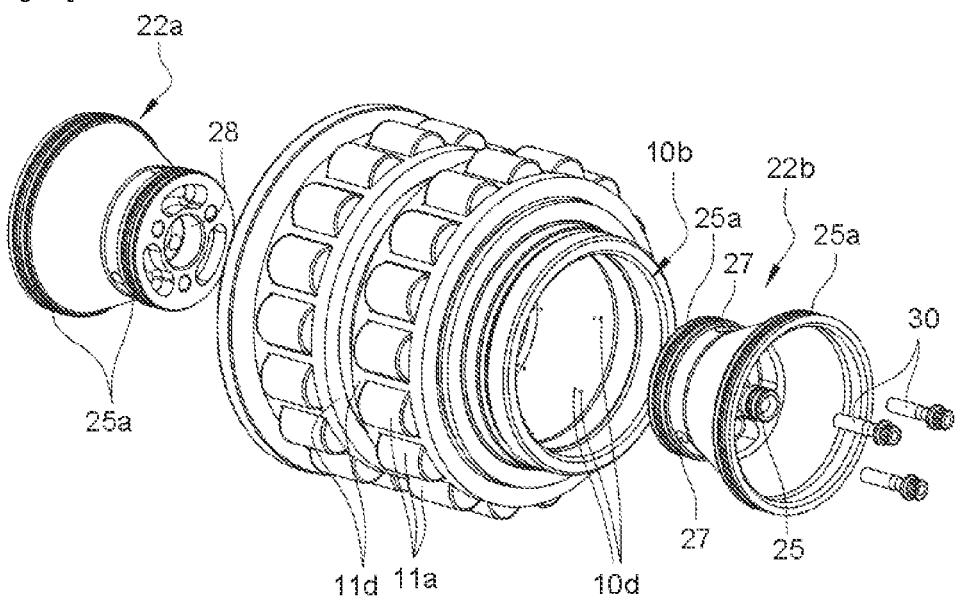
[Fig. 9]

[Fig. 10]
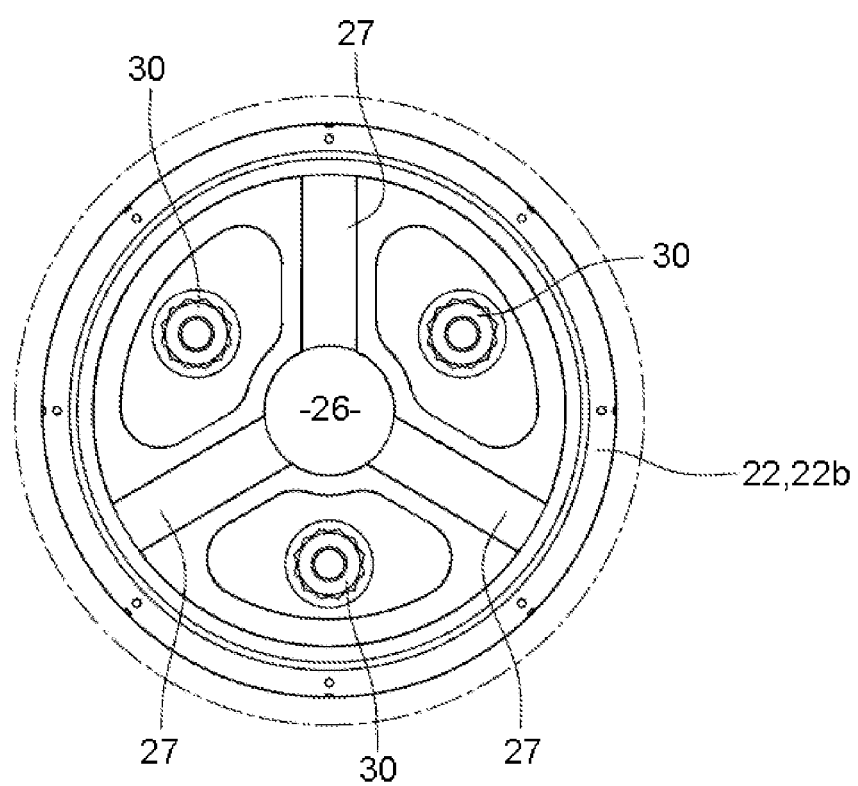

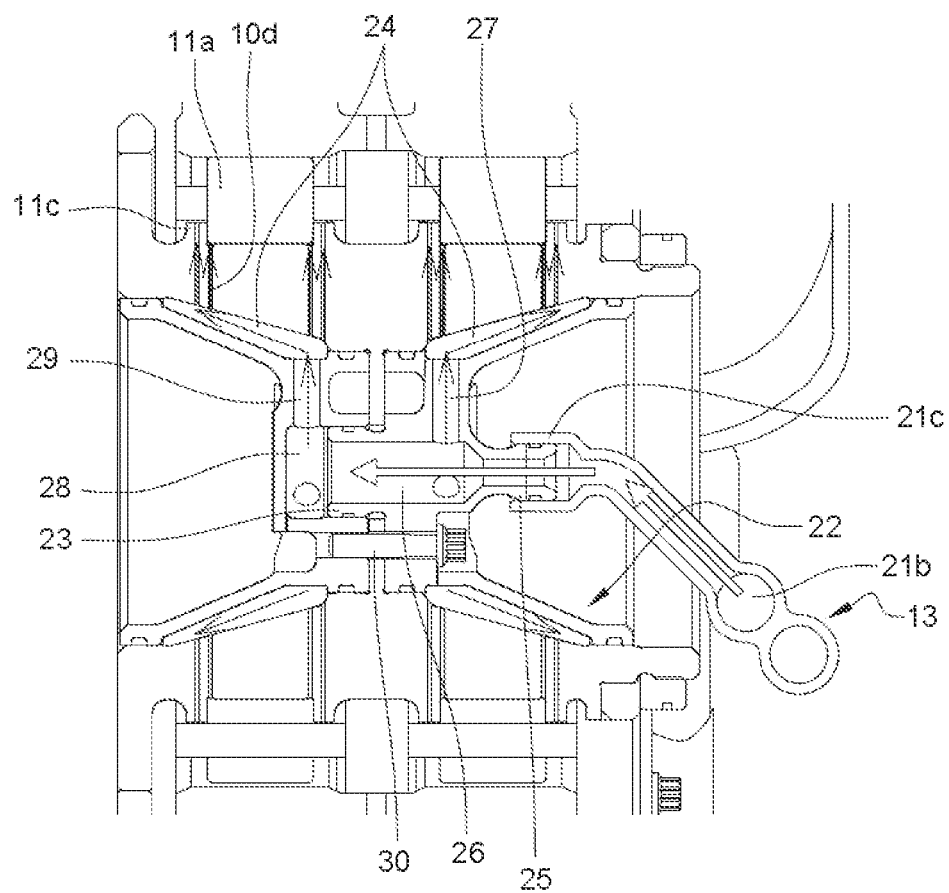
[Fig. 11]

[Fig. 12]
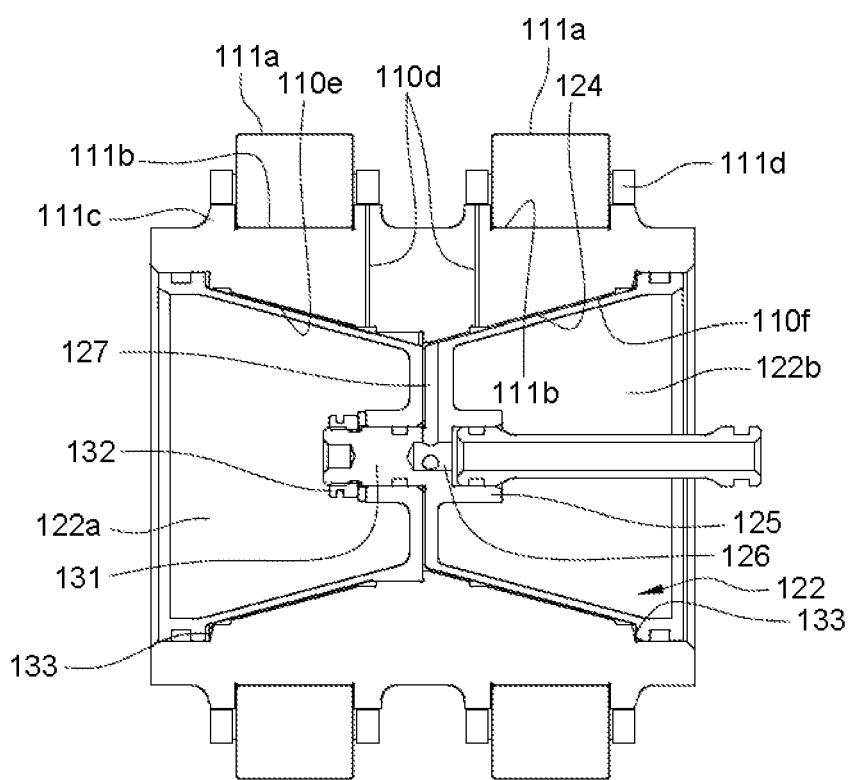

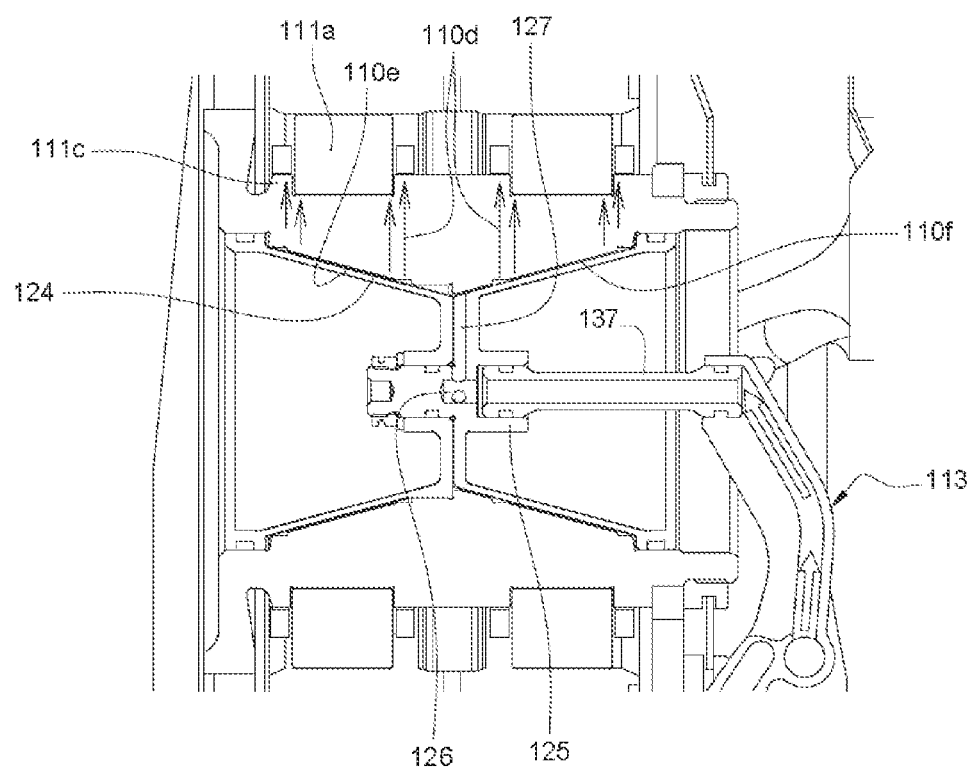
[Fig. 13]

[Fig. 14a]
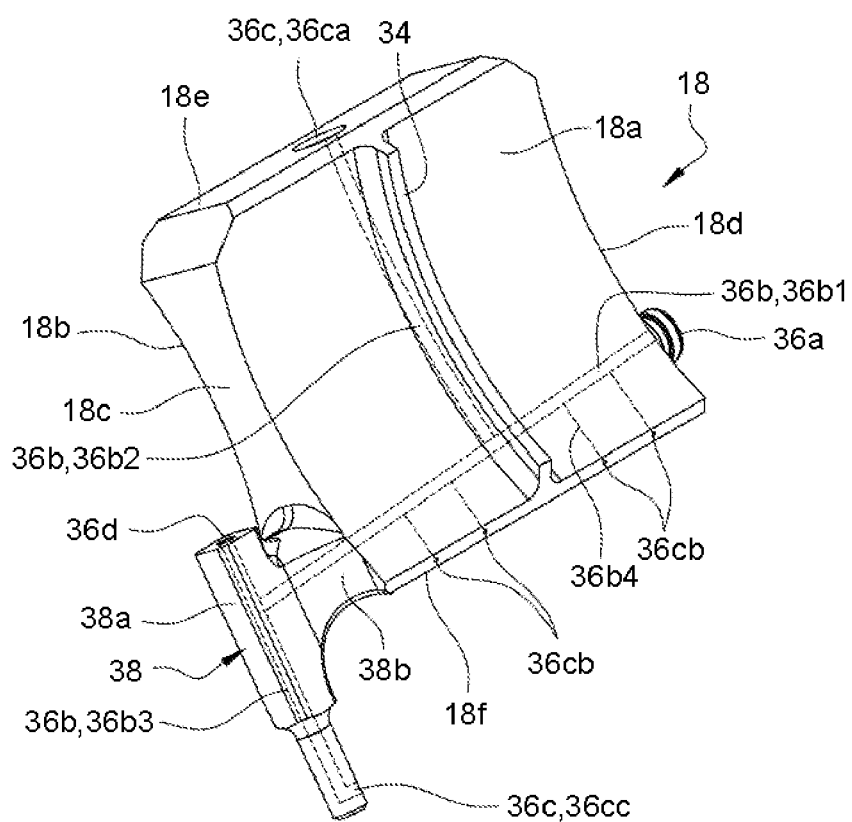

[Fig. 14b]
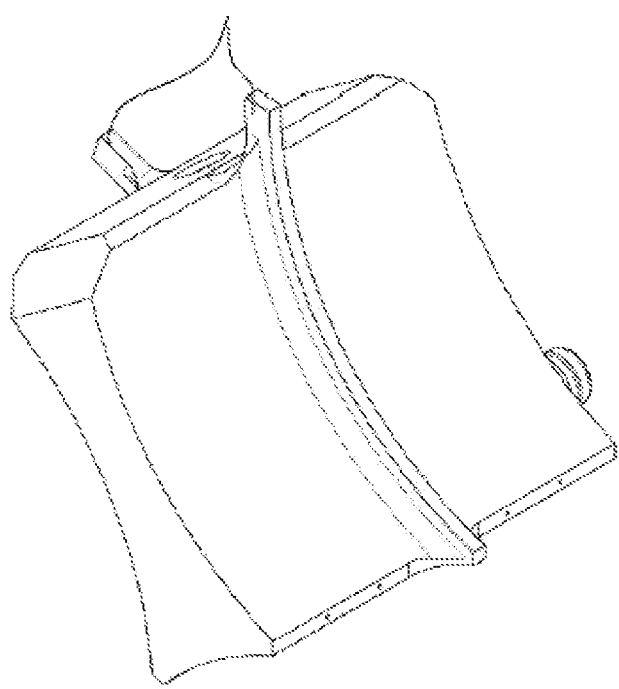

[Fig. 15]
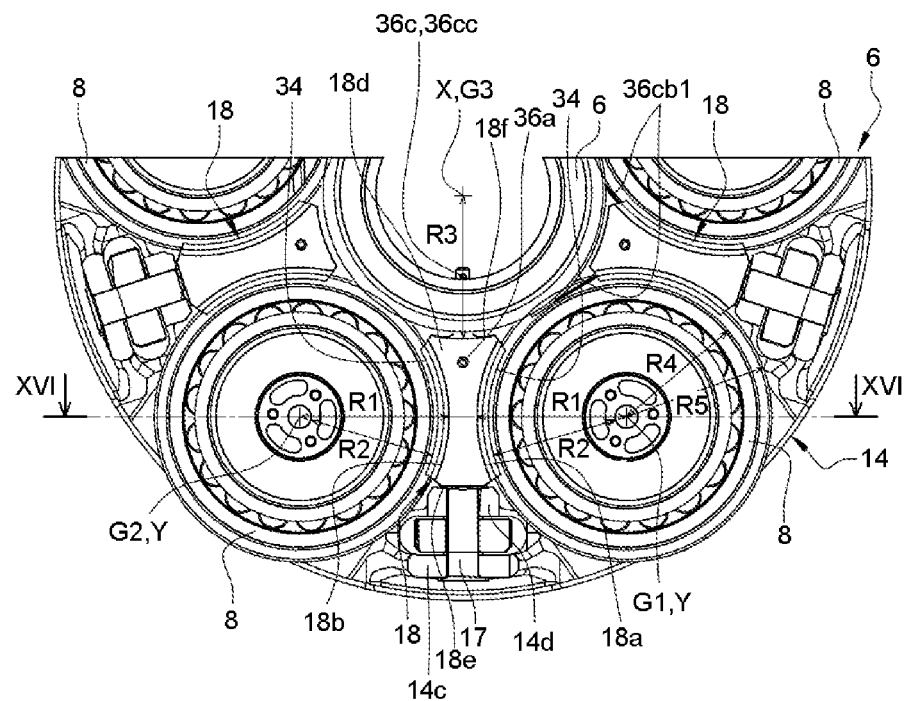

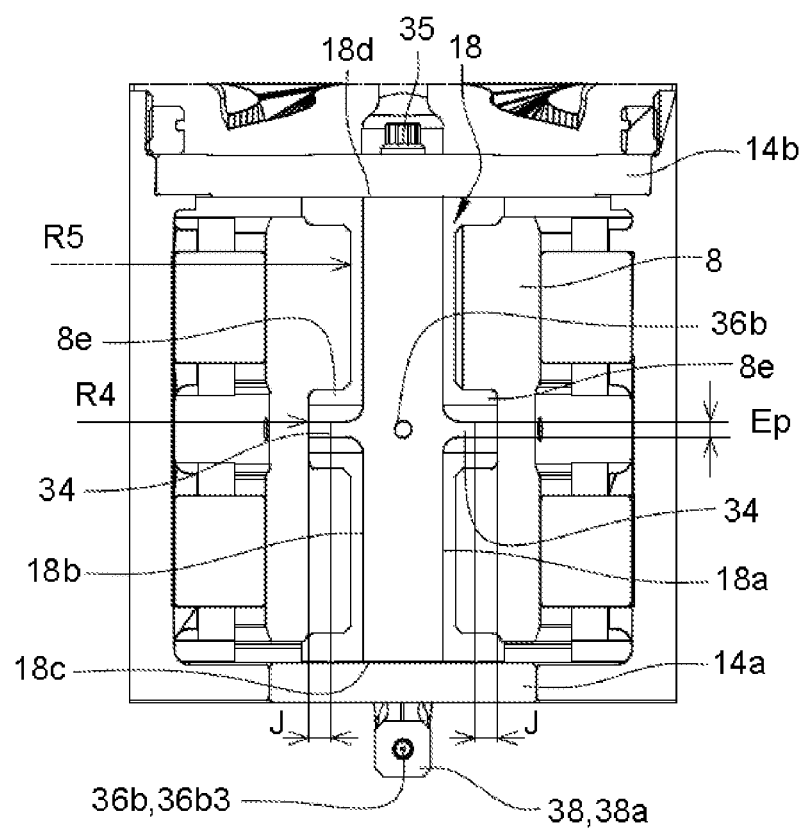
[Fig. 16]

[Fig. 17]
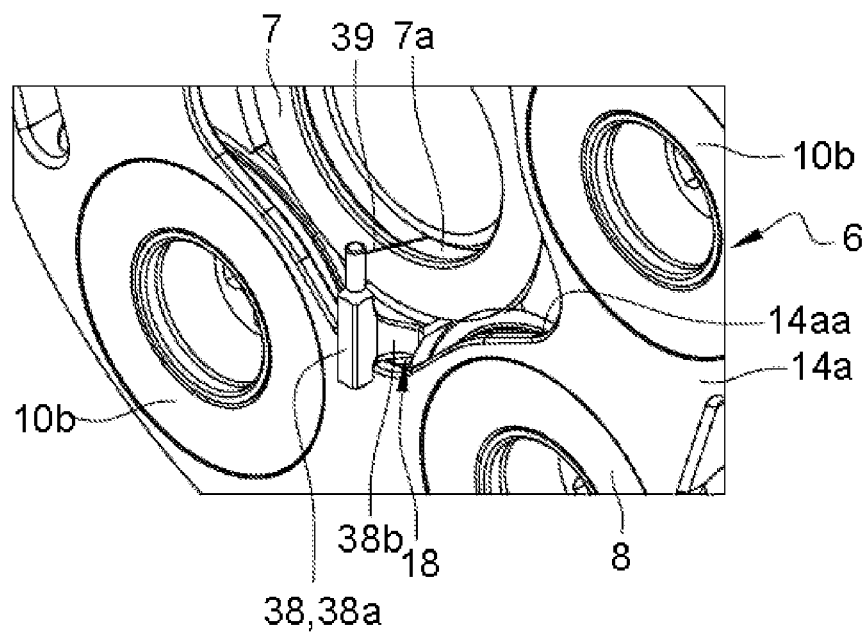

[Fig. 18]
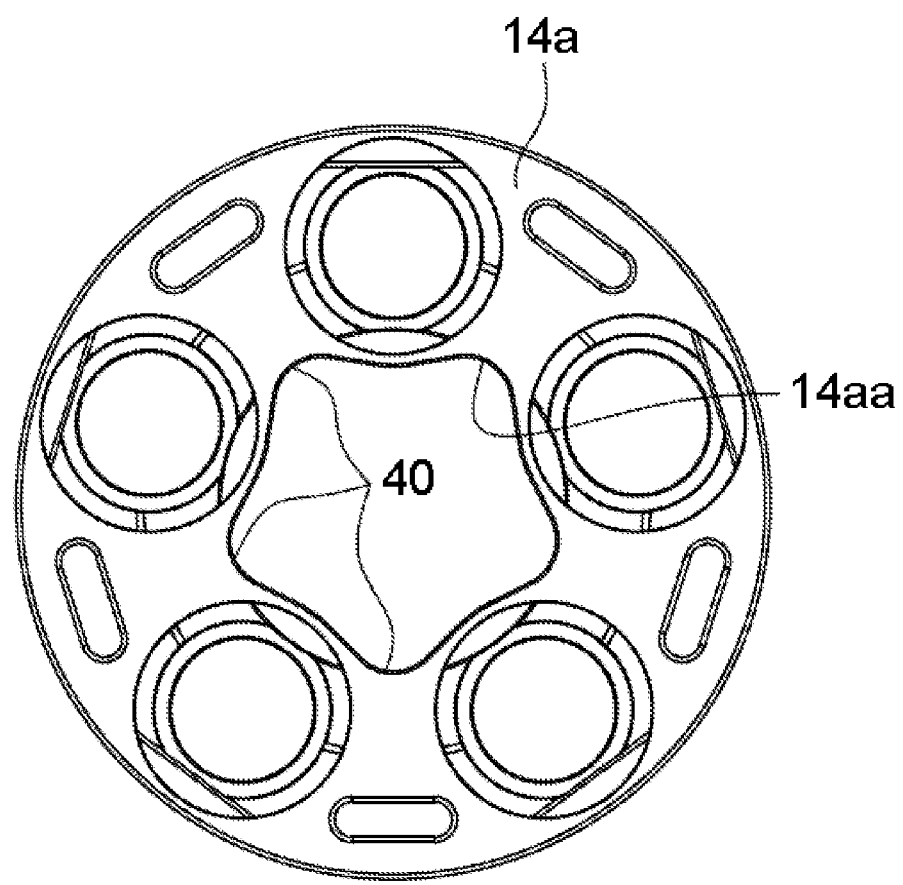

[Fig. 19]
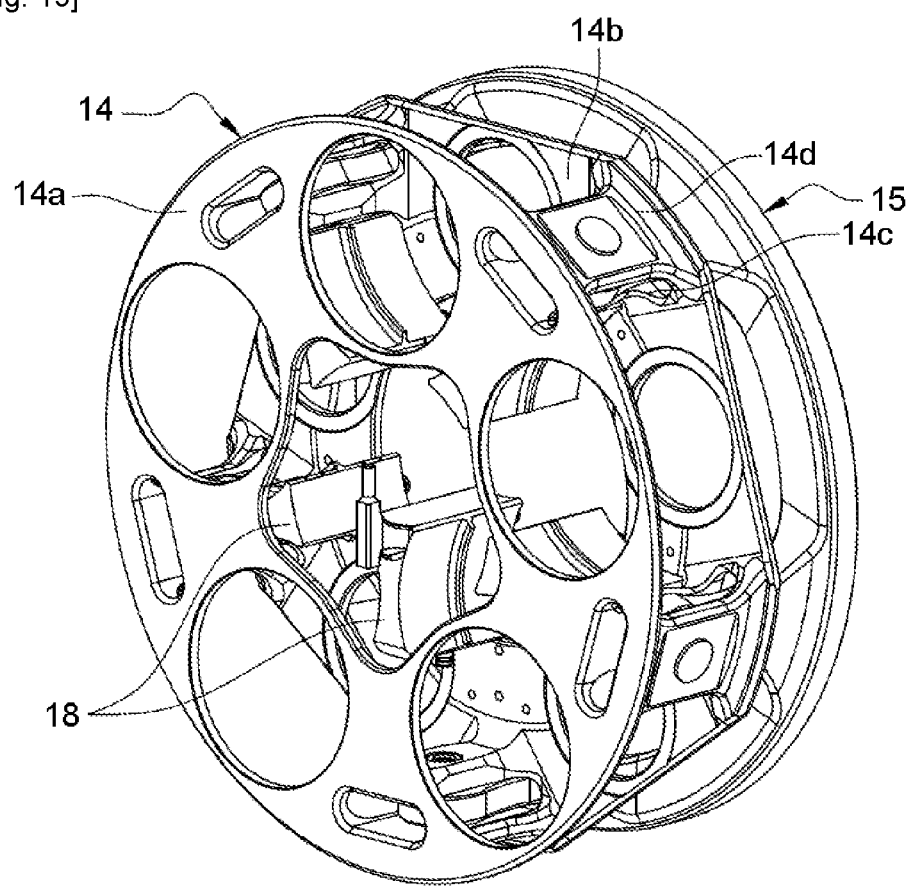

[Fig. 20]
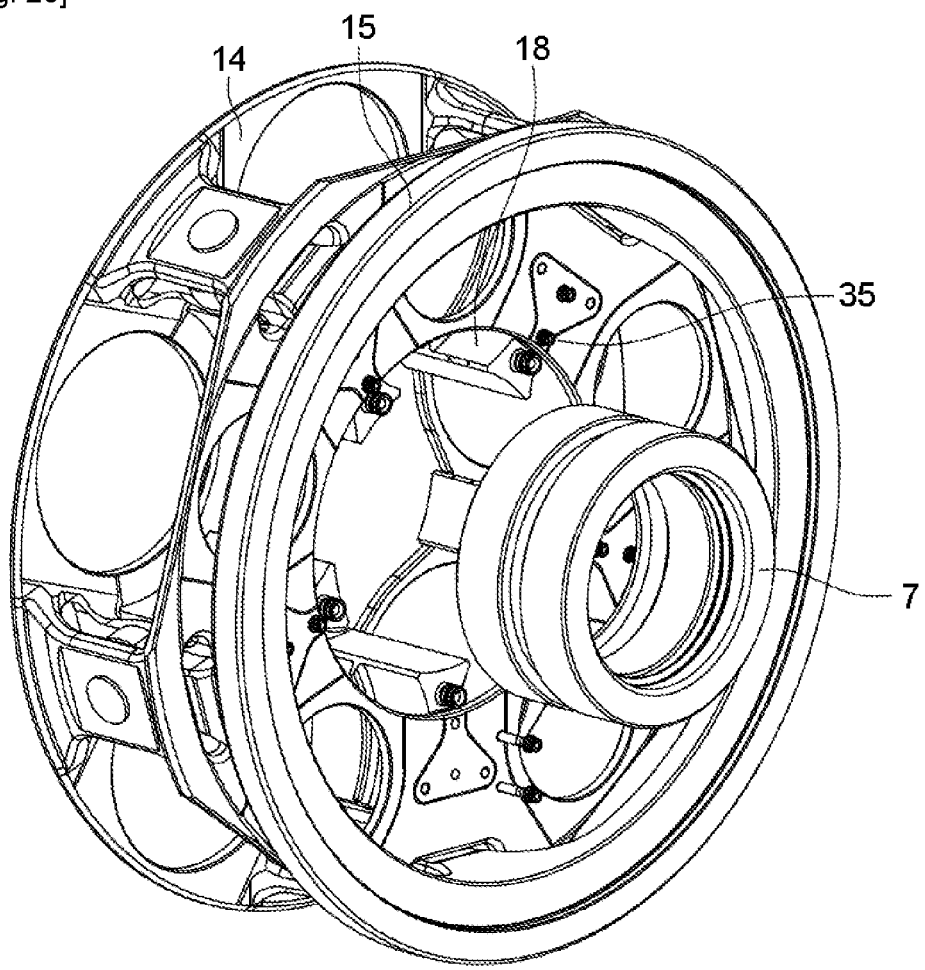

[Fig. 21]
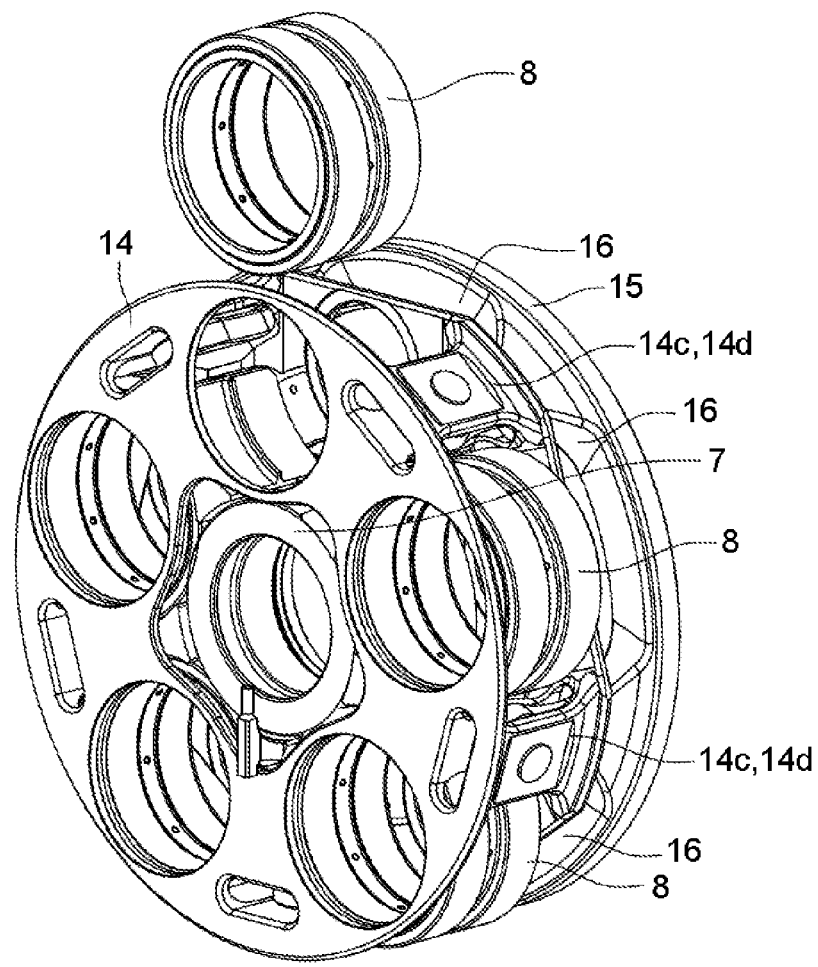

[Fig. 22]
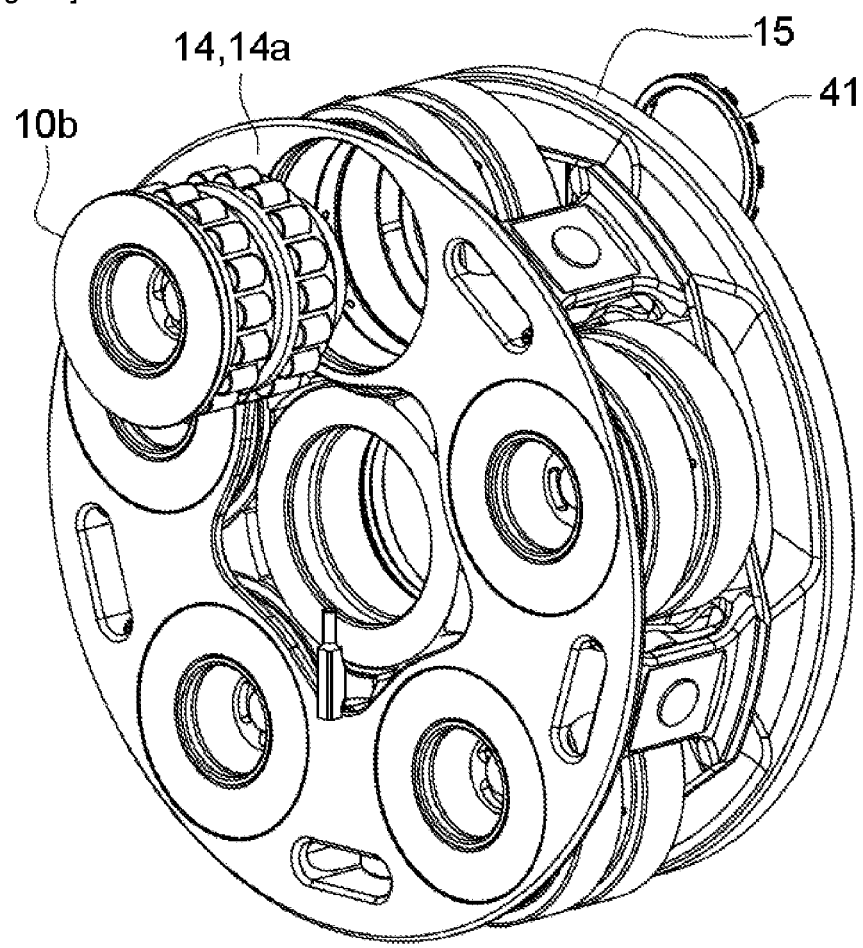

DEFLECTOR FOR A MECHANICAL REDUCTION GEAR OF AN AIRCRAFT TURBINE ENGINE

CROSS REFERENCE TO RELATED APPLICATION

This application claims priority under 35 U.S.C. § 119 to FRSN 1871750, filed Nov. 23, 2018, the entirety of which is hereby incorporated by reference.

TECHNICAL FIELD OF THE INVENTION

The present disclosure relates to the field of mechanical reduction gears for turbine engines, for example of an aircraft.

BACKGROUND

The state of the art comprises documents WO-A1-2010/092263, FR-A1-2 987 416, US-2016/146102, EP-A1-2 954 186, FR-A1-2 568 340 and FR-A1-3 041 054.

The role of a mechanical reduction gear is to modify the gear and torque ratio between the input shaft and the output shaft of a mechanical system.

The new generations of bypass turbine engines, for example those that have a high dilution ratio, comprise a mechanical reduction gear in order to drive the shaft of a fan. In the usual manner, the reduction gear transforms the fast rotation speed of the shaft of a power turbine into a slower rotation speed for the shaft driving the fan.

Such a reduction gear comprises a central wheel, termed sun, a ring and wheels called planets, which are engaged between the sun and the ring. The planets are maintained by a frame termed planet carrier. The sun, the ring and the planet carrier are planets because their axes of revolution coincide with the longitudinal axis X of the turbine engine. The planets each have an axis of revolution that is different and equally distributed over the same operating diameter around the axis of the planets. These axes are parallel to the longitudinal axis X.

There are several reduction gear architectures. In the prior art relating to bypass turbine engines, the reduction gears are of the planetary or epicyclic type. Other similar applications exist, wherein the architectures are referred to as differential or "compound."

On a planetary reduction gear, the planet carrier is fixed and the ring forms the output shaft of the device, which rotates in the opposite direction of the sun.

On an epicyclic reduction gear, the ring is fixed and the planet carrier forms the output shaft of the device, which rotates in the same direction as the sun.

On a differential reduction gear, no element is fixed in rotation. The ring rotates in the opposite direction of the sun and of the planet carrier.

The reduction gears can comprise one or several meshing stages. This meshing is provided in different ways, such as by contact, by friction or by magnetic fields.

There are several types of meshing by contact, such as with straight gear teeth or with herringbone teeth.

The present disclosure proposes an improvement of a reduction gear with a simple, effective and cost-efficient solution for improving the circulation and/or the removal of oil in a turbine engine.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to a first aspect, the present disclosure relates to a deflector for a mechanical reduction gear of a turbine engine, for example of an aircraft. In an embodiment, the deflector is configured to be inserted between two adjacent planets of the reduction gear, with this deflector comprising a block comprising a first lateral surface that is cylindrical and concave and that has a radius of curvature R1 measured from an axis G1. The block in some embodiments comprises a second lateral surface, opposite the first surface, that is cylindrical and concave and that has a radius of curvature R1 measured from an axis G2 that is parallel to G1, wherein each one of the first and second surfaces comprises at least one protruding tab that has a generally elongated shape about the axis G1, G2 of the surface considered and of which the internal periphery is concavely curved and has a radius of curvature R2 measured from this axis G1, G2 which is less than R1.

The deflector thus comprises tabs on these cylindrical surfaces surrounding the planets. Each one of these tabs is configured to be engaged in an inter-helical groove of the gear teeth of a planet, and to extend along this groove. A planet comprises such gear teeth with at least two helixes (respectively front and rear), i.e., gear teeth comprising two adjacent toothed annular strips. These two helixes are separated from one another by an annular groove. It is therefore understood that the helixes of a planet are separated by the tab from a deflector, in the installation zone of this deflector. The tab has an "inter-helical" function which is added to the main function of "inter-planet deflector."

This first aspect of the present disclosure makes it possible to prevent the recirculation of oil and of particles between the front and rear helixes of the planets. The advantages provided by this deflector are numerous: no recirculation of oil between the helixes, and therefore improved removal of the heat energy generated during operation, of the transitions of particles, rigidification of the structure of the deflector, etc.

This first aspect of the present disclosure is compatible with any type of reduction gear (planetary, epicyclic, etc.). It is also compatible with any type of gear teeth (straight, herringbone, etc.) as long as these gear teeth comprise at least two helixes. It is furthermore compatible with any type of planet carrier, whether it is of a single piece or of the cage-cage carrier type. Further, it is compatible with any type of planet bearing, whether it is made of rolling elements, of a hydrodynamic bearing, etc.

The deflector according to the present disclosure can include one or several of the following characteristics, taken separately from one another, or in combination with one another:

the deflector comprises a single protruding tab on each one of the surfaces, e.g., substantially in the middle of the surface; functionally, it is more e.g., facing the keyway or groove of the planets that are between their two helices, the deflector comprises several protruding tabs on each one of the surfaces, each tab has a circumferential extent which is less than or equal to the circumferential extent of the surface on which it is located, each tab has a circumferential extent which is greater than the circumferential extent of the surface on which it is located; the end portion of the tabs can thus extend protruding on the deflector, the deflector comprises threaded holes for receiving screws for fixing the deflector to a planet carrier of the reduction gear, the deflector comprises an integrated lubrication circuit, the circuit comprises an oil inlet connected by drill holes to at least one oil outlet, the oil inlet comprises a connection pipe by male-female press-fitting, the deflector comprises an oil outlet configured to receive a sealed fluidic connection bushing, the deflector comprises an oil outlet formed by a nozzle formed in a single part with the block, with this nozzle having more, for example, a general elongated shape and extending in a median plane of symmetry of the block, each tab has a radial dimension or thickness, measured with respect to the axis G1, G2 of the surface considered, which is substantially constant over the entire extent of this tab.

This makes it possible to stiffen the overhanging lubrication nozzle for the splines of the sun, and to limit the number of parts and the interfaces by merging the known functions of the deflector and of the nozzle while still retaining the ease of mounting of the deflector. The advantages include: a shorter nozzle (less subject to vibrations), fewer parts and therefore fewer references, less machining and less mounting, etc.

The present disclosure also relates to a planet carrier for a mechanical reduction gear of a turbine engine, for example of an aircraft. The planet carrier in an embodiment comprises a cage defining a housing for receiving a central sun of axis of rotation X, planets arranged around the sun and with each one comprising a double helix gear teeth, as well as deflectors such as described hereinabove, which are each fixed to the cage and inserted between two adjacent planets in such a way that their tabs are engaged in inter-helical grooves of the gear teeth of the planets.

Advantageously, one of the deflectors of the planet carrier comprises a nozzle which is oriented in the radial direction with respect to the axis X and inwards in such a way as to be able to spray oil onto inner splines of the sun.

Advantageously, the cage comprises a radial wall that comprises a central orifice of which a radially internal peripheral edge comprises one or several notches in order to facilitate the mounting of the deflectors and of the one comprising the nozzle.

According to a second aspect, the present disclosure relates to a core for lubricating and for cooling for a mechanical reduction gear of a turbine engine, for example of an aircraft. The core in an embodiment is configured to be mounted in an axis of a planet of the reduction gear, and comprises first and second coaxial and substantially tapered flanges with each one comprising a first end of a greater diameter and a second end opposite of smaller diameter, with the flanges being fastened together by their second ends and being configured to extend inside the axis and to cover at least one radially internal surface of this axis in order to define with the latter at least one annular cavity for the circulation of lubricating and cooling of this axis, the second ends of the first and second flanges comprising means of fluidic connection (e.g., a conduit, channel, etc.) of the at least one cavity to a source of lubrication and cooling oil.

The core functions to receive the lubricating oil then to distribute it and to convey it to the various elements of the reduction gear. The core comprises two separate circuits, which is advantageous because the circuits can circulate oil at flow rate and/or at temperatures that are different and limits the transfer of pollution. The single-piece design of this core makes it possible to facilitate the mounting thereof in the reduction gear, to optimise the mass thereof, and to limit the vibration phenomena. The diameter of this core is advantageously chosen to facilitate the integration thereof into the reduction gear. The diameter of the reduction gear and of its chambers is for example less than the outer diameter of the planet carrier (or of the cage or of the cage carrier of the planet carrier) and greater than the outer diameter of an input shaft of the reduction gear which is engaged in the sun and coupled to the sun. This input shaft can comprise a bellows segment that provides a certain flexibility to the shaft to best take up the misalignments of the drive shaft.

The advantages provided by this aspect are: a better integration of the core into the engine, a significant release of space in order to increase the size of the flexibility of the drive shaft (which allows for a better taking up of misalignments of the reduction gear), a potentially more rigid structure (and therefore less subject to vibration phenomena), the same connection interface possible for the various outlets, a shorter oil path with less pressure loss, etc.

This second aspect of the present disclosure is mainly designed for a reduction gear of the planetary type but could be compatible with an epicyclic reduction gear providing a few arrangements are made. It is compatible with any type of gear teeth (straight, herringbone), as well as any type of planet carrier whether it be of a single piece or of the cage and cage carrier type. Further, this aspect is compatible with any type of planet bearing, whether it is comprised of rolling elements, of a hydrodynamic bearing, etc.

The core according to the present disclosure can include one or several of the following characteristics, taken separately from one another, or in combination with one another:

each one of the first ends, even also each one of the second ends, comprises an outer cylindrical surface for centering comprising an annular keyway for receiving a seal, one of the flanges comprises an inner chamber centered on an axis Y common to the flanges, with this chamber being connected on the one hand by radial passages formed in the flange or between the two flanges to the at least one annular cavity, and on the other hand to a connection pipe centered on the axis Y, the pipe is configured to cooperate by male-female press-fitting, for example with a fluidic connection bushing which can be used to connect the pipe to a lubrication oil distributor, the chamber has a generally cylindrical shape centered on the axis Y and comprises a longitudinal end connected to the pipe and an opposite longitudinal end that is either closed, or open and which opens into another chamber, with this other chamber being formed in the other flange and being connected by other radial passages to the at least one annular cavity, the flanges are configured to be fastened to one another and only to one another, the flanges are configured to be fastened to one another as well as to an annular fastening flange of the planet axis, the flanges are bearing on either side of the flange; as there is no more clearance, the core cannot translate along the axis Y; the mounting is therefore less hyperstatic, the flanges are fixed by one or several screws distributed around the axis Y; as the means of fastening (e.g., fasteners, such as screws or bolts) do not coincide with the axis of the bearing and as it passes through a passage hole of the latter, this prevents the core from rotating about itself; the core thus has its last degree of freedom blocked, the core comprises an inner chamber which is sized to ensure a distribution of oil through its slowing down, making it possible reduce the effects of the kinetics of fluids.

The present disclosure further relates to a planet axis for a mechanical reduction gear of a turbine engine, for example of an aircraft. In an embodiment, the axis has a general pipe shape and comprises substantially radial orifices extending between at least one radially internal surface of this axis and the outer periphery of this axis, a core such as described hereinabove being mounted in this axis and covering the at least one surface.

The axis according to the present disclosure can comprise one or several of the following characteristics, taken separately from one another, or in combination with one another:

- the outer periphery of the axis is configured to define at least one, e.g., two, bearing raceway (s),
- the inner periphery of the axis is of the biconical type and comprises two coaxial tapered surfaces and flaring in opposite directions, with these two tapered surfaces being covered by the flanges and defining with these flanges one or two annular cavities for the circulation of oil.

According to a third aspect, the present disclosure relates to a distributor of lubrication oil for a mechanical reduction gear of a turbine engine, for example of an aircraft. In an embodiment, the distributor has a general annular shape around an axis X and is formed of a single piece, with this distributor comprising first and second independent oil circuits, the first oil circuit comprising a first oil inlet connected by a first annular chamber to several oil outlets distributed over a first circumference C1 around the axis X, and the second oil circuit comprising a second oil inlet connected by a second annual chamber to several oil outlets distributed over a second circumference C2 around the axis X, with the first and second circumferences having different diameters.

The axis of a reduction gear planet is guided by at least one bearing. The heat generated by the passing of the mobile elements of the rolling of the bearing should be removed. The bearing is supplied with oil through orifices radially passing through the axis of the planet. The circulation of this oil inside the planet axis and on the inner periphery of the axis, makes it possible to absorb the heat energy generated by the bearing during operation. This heat energy is transmitted via conduction from the inner ring of the bearing, which can be integrated to the outer periphery of the axis of the planet, to the inner periphery of this axis. The present disclosure applies to varied forms of the inner periphery of the planet axis, and for example a biconical inner periphery. The use of two independent flanges makes it possible to hugs all shapes of the inner periphery of an axis, and a biconical shape, so as to form one or several cavities for the circulation of oil for the lubricating and the cooling of the axis.

The solution proposed is compatible with any type of reduction gear (planetary, epicyclic, etc.). This solution is compatible with any type of gear teeth (straight, herringbone), and with any type of planet carrier whether it be a single piece or of the cage-cage carrier type. Further, the solution is compatible with planet bearings comprised of rolling elements (ball bearings, roller bearings, taper roller bearings, etc.).

The distributor according to the present disclosure can comprise one or several of the following characteristics, taken separately from one another, or in combination with one another:

- the first and second inlets are directed in the radial direction with respect to the axis X,
- the first and second inlets are located in the same plane perpendicular to the axis X and are inclined with respect to one another by a determined angle,
- the first and second chambers have in the axial cross-section a general circular shape,
- the first and second chambers are formed by two coaxial and intimately linked tubular rings,
- the diameter of the first circumference C1 is less than those of the rings, and the diameter of the second circumference C2 is greater than those of the rings,
- the first and/or second outlets are axially oriented in the same direction,
- the distributor comprises fastening lugs comprising orifices for passing screws,
- the first and second chambers each have a diameter greater than the outer diameter of a portion of a shaft configured to pass axially through the distributor; this shaft is an input shaft of the reduction gear,
- the diameter and the orientation of the first and second chambers are arranged in such a way that oil outlet conduits are of similar length; this arrangement also makes it possible to have oil inlet conduits of the shortest length, of the most linear form while still having a comfortable radius of curvature; this also allows the conduits of circular section to open entirely and tangentially onto their respective chamber; it is thus possible to fulfil all of these conditions while still having the axes of the oil inlets on the same median plane; it is advantageous on the one hand to have short oil inlets so as to be able to mount the distributor which is diametrically smaller than the diameter of the cage carrier; on the other hand, it is advantageous to have linear conduits and which open entirely and tangentially onto the chambers in order to reduce the pressure losses to the minimum;
- all of the oil outlets, whether they are connected to the first chamber or to the second chamber, are identical; this makes it possible to have the same machining tools, the same controls and the same O-ring seals on the deflectors as those of the core,
- at least some of the oil outlets are advanced in such a way as to fit inside the axis and inside the rear flange of the core; this makes it possible to decrease the length of the oil conduit and to increase the rigidity of the mounting.

The present disclosure further relates to a planet carrier for a mechanical reduction gear of a turbine engine, for example of an aircraft, comprising, for example, a cage defining a housing for receiving a central sun of axis X of rotation and planets arranged around the sun, a distributor such as described hereinabove being added and fastened onto the cage.

Advantageously, the cage comprises at its periphery axial housings configured to receive axial fingers integral with a cage carrier of the reduction gear, with each housing being passed through by a substantially radial pin which is configured to guide in rotation a means of connection, such as a ball or a bearing, carried by one of the fingers, the first and second inlets of the distributor being oriented respectively according to first and second directions that each pass through a sector of free space delimited axially by the cage and the cage carrier and extending circumferentially between two adjacent fingers.

The present disclosure further relates to a mechanical reduction gear of a turbine engine, for example of an aircraft, comprising at least one of the elements (deflector, core, distributor, planet carrier, axis, etc., described hereinabove, as well as a turbine engine comprising such a reduction gear.

The characteristics of the various aspects of the present disclosure can be combined with one another.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein:

FIG. 1 is a diagrammatical axial cross-section view of a turbine engine according to one representative embodiment of the present disclosure, FIG. 2 is a partial view of an axial cross-section of a mechanical reduction gear, FIG. 3 is an axial cross-section view of a mechanical reduction gear including several aspects of the present disclosure, FIG. 4 is a perspective view of the reduction gear of FIG. 3, FIG. 5 is a perspective view of a distributor of lubrication oil of the reduction gear of FIG. 3, FIG. 6 is a cross-section view of a detail of the reduction gear of FIG. 3 and shows an oil inlet of the distributor of FIG. 5, FIG. 7 is a cross-section view of a detail of the reduction gear of FIG. 3 and shows an oil inlet of the distributor of FIG. 5, FIG. 8 is a cross-section view of a detail of FIG. 3 and shows a planet axis in which is mounted a lubricating and cooling core, FIG. 9 is an exploded perspective view of the axis and of the core of FIG. 8, FIG. 10 is a cross-section view according to the line X-X of FIG. 8, FIG. 11 is a view similar to that of FIG. 8 and shows the lubricating and cooling oil flow, FIG. 12 is a view similar to that of FIG. 8 and showing an alternative embodiment of the core, FIG. 13 is a view similar to that of FIG. 12 and shows the lubricating and cooling oil flow, FIG. 14a is a perspective view of a deflector, FIG. 14b is a view similar to that of FIG. 14a and showing an alternative embodiment of a deflector, FIG. 15 is a partial view of a radial cross-section of the reduction gear of FIG. 3 and shows the position of the deflector of FIG. 14 in this reduction gear, FIG. 16 is a cross-section view according to line XVI-XVI of FIG. 15, FIG. 17 is a partial view in perspective of a front face of the reduction gear of FIG. 3, FIG. 18 is a view of the front face of the reduction gear of FIG. 3, FIG. 19 is a diagrammatical view in perspective of the reduction gear of FIG. 3, and shows a step of assembling this reduction gear, FIG. 20 is a diagrammatical view in perspective of the reduction gear of FIG. 3, and shows a step of assembling this reduction gear, FIG. 21 is a diagrammatical view in perspective of the reduction gear of FIG. 3, and shows a step of assembling this reduction gear, FIG. 22 is a diagrammatical view in perspective of the reduction gear of FIG. 3, and shows a step of assembling this reduction gear.

DETAILED DESCRIPTION

FIG. 1 describes one representative embodiment of a turbine engine 1 that comprises, conventionally, a fan S, a low-pressure compressor 1a, a high-pressure compressor 1b, an annular combustion chamber 1c, a high-pressure turbine 1d, a low-pressure turbine 1e and an exhaust pipe 1h. The high-pressure compressor 1b and the high-pressure turbine 1d are connected by a high-pressure shaft 2 and form with it a high-pressure body (HP). The low-pressure compressor 1a and the low-pressure turbine 1e are connected by a low-pressure shaft 3 and form with it a high-pressure body (LP).

The fan S is driven by a fan shaft 4 which is driven to the shaft LP 3 by means of a reduction gear 6. This reduction gear 6 is generally of planetary or epicyclic type.

Although the following description relates to a reduction gear of the planetary or epicyclic type, it also applies to a mechanical differential in which the three components, which are the planet carrier, the ring and the sun, are rotationally mobile, with the speed of rotation of one of these components depending on the differences in speeds of the other two components.

The reduction gear 6 is positioned in the front portion of the turbine engine. A fixed structure diagrammatically comprising, here, an upstream portion 5a and a downstream portion 5b that comprises the engine casing or stator 5 is arranged in such a way as to form an enclosure E that surrounds the reduction gear 6. This enclosure E is here closed upstream by seals on a bearing allowing the fan shaft 4 to be passed through, and downstream by seals on the passing through of the shaft LP 3.

FIG. 2 shows a reduction gear 6 that can have different architectures according to whether certain parts are fastened or in rotation. At the inlet, the reduction gear 6 is connected to the shaft LP 3, for example by the intermediary of inner splines 7a. Thus, the shaft LP 3 drives a planetary wheel termed the sun 7. Conventionally, the sun 7, of which the axis of rotation coincides with that of the turbine engine X, drives a series of wheels termed planets 8, which are equally distributed over the same diameter around the axis of rotation X. This diameter is equal to double the operating center distance between the sun 7 and the planets 8. The number of planets 8 is generally defined between three and seven for this type of application.

The set of planets 8 is maintained by a frame termed planet carrier 10. Each planet 8 rotates about its own axis Y and meshes with the ring 9.

At the outlet there is:
In an epicyclic configuration, the set of planets 8 drives in rotation the planet carrier 10 around the axis X of the turbine engine. The ring is fastened to the engine casing or stator 5 via a ring carrier 12 and the planet carrier 10 is fastened to the fan shaft 4.
In a planetary configuration, the set of planets 8 is maintained by a planet carrier 10 which is fastened to the engine casing or stator 5. Each planet drives the ring that is added to the fan shaft 4 via a ring carrier 12.

Each planet 8 is mounted free to rotate using a bearing 11, for example of the roller bearing type of hydrostatic bearing type. Each bearing 11 is mounted on one of the axes 10b of the planet carrier 10 and all of the axes are positions in relation to one another using one or several structural frames 10a of the planet carrier 10. There is a number of axes 10b and of bearings 11 equal to the number of planets. For reasons of operation, mounting, manufacturing, control, repairs or changes the axes 10b and the frame 10a can be separated into several parts.

For the same reasons as mentioned hereinabove, the gear teeth of a reduction gear can be separated into several helices that each have a median plane P. Details of the operation of a reduction gear with several helices with a ring separated into two half-rings include:

A front half-ring 9a formed from a rim 9aa and of a fastening half-flange 9ab. On the rim 9aa is located the front helix of the gear teeth of the reduction gear. This front helix meshes with that of the planet 8 which meshes with that of the sun 7.

A rear half-ring 9b formed from a rim 9ba and of a fastening half-flange 9bb. On the rim 9ba is located the rear helix of the gear teeth of the reduction gear. This rear helix meshes with that of the planet 8 which meshes with that of the sun 7.

Although the helices widths vary between the sun 7, the planets 8 and the ring 9 due to the overlapping of gear teeth, they are all centered on a median plane P for the front helices and on another median plane P for the rear helices. In the other figures, in the case of a bearing with two rows of rollers, each row of rolling elements is also centered on two median planes.

The fastening half-flange 9ab of the front ring 9a and the fastening half-flange 9bb of the rear ring 9b form the fastening flange 9c of the ring. The ring 9 is fastened to a ring carrier by assembling the fastening flange 9c of the ring and the fastening flange 12a of the ring carrier using a bolted mounting for example.

The arrows of FIG. 2 describe the flow of the oil in the reduction gear 6. The oil arrives in the reduction gear 6 from the stator portion 5 in the distributor 13 via different means which will not be specified in this view because they are specific to one or several types of architecture. The distributor is separated into 2 parts in general each one repeated with the same number of planets. The injectors 13a function to lubricate the gear teeth and the arms 13b function to lubricate the bearings. The oil is conveyed to the injector 13a in order to exit through the end 13c so as to lubricate the gear teeth. The oil is also conveyed to the arm 13b and circulates via the feeding mouth 13d of the bearing. The oil then circulates through the axis in one or several buffer zones 10c to then exit via the orifices 10d so as to lubricate the bearings of the planets.

FIGS. 3 and 4 show an embodiment of a reduction gear 6 comprising several aspects of the present disclosure.

One of these aspects relates to a distributor of lubrication oil and shall be described in what follows in reference to FIGS. 5 to 7. Another aspect of the present disclosure relates to a core for lubrication and cooling and shall be described in what follows in reference to FIGS. 8 to 13, and a further aspect of the present disclosure relates to a deflector and shall be described in what follows in reference to FIGS. 14 to 22.

The reduction gear 6 of FIGS. 3 and 4 comprises a planet carrier 10 of the cage 14 and cage carrier 15 type, with the cage 14 and the cage carrier 15 being connected by swivel joints.

The cage 14 comprises two radial annular walls 14a, 14b extending around the axis X, with these walls 14a, 14b being parallel and being respectively a front radial wall 14a and a rear radial wall 14b. The walls 14a, 14b are connected together to their outer peripheries by pairs of yokes 14c, 14d, regularly distributed around the axis X. These pairs of yokes provide a structural connection between the walls 14a, 14b. Each pair of yokes comprises two yokes, respectively radially external 14c and radially internal 14d, which extend substantially in parallel along the axis X at a radial distance from one another.

The pairs of yokes 14c, 14d define between them holes 16 which extend circumferentially around the axis X and are delimited axially by the outer peripheral edges of the walls 14a, 14b. The pairs of yokes number 5 in the example shown.

Each pair of yokes forms a clevis to receive a finger 15a of the cage carrier 15. In other words, the yokes of each pair define between them a housing for receiving a finger 15a of the cage carrier 15. Oblong shaped openings 14e are made in the rear wall 14b in such a way as to allow the fingers 15a to pass between the yokes 14c, 14d. The wall 14a can comprise similar openings axially aligned with the openings 14e of the wall 14b.

The number of fingers 15a is equal to the number of pairs of yokes 14c, 14d and is 5 in the example shown. These fingers 15a extend protruding axially in the upstream direction from a ring 15b of the cage carrier 15 extending around the axis X. The fingers 15a of the cage carrier 15 are engaged in the inter-yoke housings by axial translation from the rear, through the openings 14e of the wall 14b.

Each finger 15a comprises, substantially at its middle, a recess for mounting a bearing (not shown) configured to be passed through by a cylindrical pin 17 carried by each pair of yokes 14c, 14d. Each pin 17 passes through the inter-yoke housing and has a substantially radial orientation with respect to the axis X. Each pin 17 comprises a cylindrical body 17a connected at an end, here radially external, to a collar 17b. The pin 17 is here engaged by radial translation from the outside through radial orifices of the yokes 14c, 14d, its collar 17b being configured to radially bear against a flat face 14ca of the external yoke 14c. After insertion of the pin 17 into the orifices of the yokes, until the collar 17b bears on the external yoke, the collar 17b is fastened to this yoke for example by screwing.

As can be seen in the drawings, in the assembled position, the ring 15b of the cage carrier 15 is axially separated by a predetermined distance L1 from the rear wall 14b facing the cage 14 (FIG. 3). The annular space extending between the outer periphery of the cage 14 and the outer periphery of the cage carrier 15 is sectored by the fingers 15a that thus define between them sectors of space Si (FIG. 4).

The cage 14 defines an internal housing for receiving the sun 7 of axis X, planets 8 arranged around the sun 7 and meshing with it, as well as deflectors 18 which shall be described in detail in what follows in reference to FIG. 14 and the following.

As described hereinabove in relation with FIG. 2, the sun 7 comprises inner splines 7a for coupling to complementary outer splines 3a of the shaft LP 3 (FIG. 3). It is possible to observe that the splines 3a are located at the front end of the shaft LP 3 which comprises a downstream segment 3b in the form of a bellows. This segment 3b is here located in a plane P1 perpendicular to the axis X which is axially separated from the cage 14 of the planet carrier 10 and which passes substantially through the ring 15b of the cage carrier 15 in our example. This segment 3b provides the shaft LP 3 with a certain flexibility which limits the transmission of the forces of the engine during operation to the reduction gear.

The splines 3a are here located on a circumference C3 of axis X and of diameter D3, and the segment 3b has an outer diameter D3' that is greater than D3 and less than the inner diameter D5 of the ring 15b.

The reduction gear 6 comprises an improved distributor 13 of lubrication oil that is better seen in FIG. 5.

The distributor 13 has a generally annular shape around the X axis and is formed from a single piece. It is here added and fastened onto the planet carrier 10 and comprises for this fastening lugs 19a on the cage 14 of the planet carrier and on its rear wall 14b, as shown in FIG. 4. The lugs 19a are regularly distributed around the X axis and include portions applied on the downstream radial face of the wall 14b and comprising orifices for the passing of screws 19b screwed into threaded holes of the wall 14b.

The distributor 13 comprises first and second independent oil circuits 20, 21, with the first oil circuit 20 comprising a first oil inlet 20a connected by a first annular chamber 20b to several oil outlets 20c distributed on a first circumference C1 about the X axis, and the second oil circuit 21 comprises a second oil inlet 21a connected by a second annular chamber 21b to several oil outlets 21c distributed over a second circumference C2 about the X axis (FIGS. 3 and 5).

The circumference C1 has a diameter D1 and the circumference C2 has a diameter D2, D2 being greater than D1. The oil outlets 20c are on D1 or C1 and the outlets 21c are on D2 or C2. In the example shown, D1 and D2 are each greater than D3 and less than D5.

The distributor 13 is diametrically smaller than D5 which allows the mounting/dismounting therefore without needing to touch the rest. Because of the pins 17 and of the deflectors 18, the cage and the cage carrier are mounted first, then the sun 7, the planets 8, the axes 10b and the distributor 13, as shall be described in more detail in what follows.

The outer diameter of the distributor 13 corresponds to the end of the inlets 20a, 21a (which terminate at the same circumference).

The chambers 20b, 21b are formed by two coaxial and intimately linked tubular rings, i.e. their tubular walls are merged. The chambers have in the axial cross-section a general circular shape and the sections for passage of the chambers are substantially constant over their entire angular extent and substantially identical to one another.

The first chamber 20b extends substantially over a circumference C4 of diameter D4 between D1 and D2. The second chamber 21b extends substantially over another circumference C4' of diameter D4' between D1 and D2. D4' is greater than D4. The circumferences C4 and C4' are centered on the X axis. D1 is less than D4 and D4' while D2 is greater than D4 and D4'. It is advantageous that C4 and C4' are located substantially midway (radial) from C1 and C2, as this stiffens the distributor 13.

The larger diameter chamber 21b is located before the one of smaller diameter 20b. As can be seen in FIG. 4, the chambers extending in the planes P2, P3 perpendicular to the X axis, that pass between the cage 14, on the one hand, and the ring 15b of the cage carrier 15, on the other hand. It can also be observed in this figure that the plane P3 that passes through the second chamber 20b or rear chamber is close to the segment 3b of the shaft LP 3 and its diameter D4' is greater than that D3' of the segment 3b in order to prevent any risk of contact during operation.

The inlets 20a, 21a are oriented in a radial direction in relation to the X axis. They may be located in the same plane P4 perpendicular to the X axis and are inclined in relation to one another in this plane P4 by a determined angle α (FIGS. 5 to 7). This angle α is for example between 30 and 60°. As can be seen in FIG. 4, the inlets 20a, 21a are oriented respectively according to directions that each pass through one of the aforementioned sectors of space S. A finger 15a of the cage carrier passes between the two inlets 20a, 21a.

The planes P2, P3 and P4 are located between the cage 14 and the ring 15b of the cage carrier 15 (FIGS. 6 and 7).

The distributor 13 is advantageously configured to be connected fluidically, on its inlets and outlets, by press-fittings of the male-female type, i.e. by couplings that nest via axial translation of a male coupling into a female coupling. Although a coupling is present in what follows as male and configured to cooperate with a female coupling, it can alternatively be replaced with a female coupling configured therefore to cooperate with a male coupling, and conversely.

With regards to the inlets 20a, 21a, they each include a female coupling 20aa, 21aa in the example shown which is configured to receive the male coupling of a feed pipe 20f, 21f (FIGS. 4, 6 and 7). The pipes 20f, 21f are straight and pass through the aforementioned sectors of space S and are configured to also pass through tubular arms of an intermediate casing of the turbine engine 1, in order to connect the distributor 13 to a source of lubrication oil. The number of arms of the intermediate casing can be greater than 5 and therefore than the number of sectors of space S. The seal of the male-female couplings can be provided by O-ring seals or similar seals.

The female couplings 20aa, 21aa of the inlets 20a, 21a are connected to the respective chambers by conduits 20d, 21d. The coupling 20aa of the inlet 20a is connected to the chamber 20b that is farthest from the plane P4 by a conduit 20ab that is generally S shaped (FIG. 6). The coupling 21aa of the inlet 21a is connected to the chamber 21b that is closest to the plane P4 by a conduit 21ab which has a straight or slightly bend shape (FIG. 7).

With regards to the outlets 20c, they each include a female coupling 20ca in the example shown which is configured to receive the male coupling of one of the deflectors 18. These outlets 20c are oriented axially, all in the same direction here towards the front. The couplings 20ca of these outlets are connected to the chamber 20b by with substantially L or V shaped channels 20d (FIG. 5).

With regards to the outlet 21c, they each include a female coupling 21ca in the example shown which is configured to receive the male coupling of one of the lubricating and cooling cores 22 that shall be described in detail in what follows in reference to FIGS. 8 to 13. These outlets 21c are oriented axially, all in the same direction here towards the front. The couplings 21ca of these outlets are connected to the chamber 21b by substantially L or V shaped conduits 21d.

As can be seen in FIG. 3, the axial lengths or dimensions of the channels 20d and of the conduits 21d are different, the outlets 21c being located in a plane P5 perpendicular to the X axis which is further frontwards than P6 that passes through the outlets 20c. The planes P5 and P6 are located in the cage 14.

Finally, as can be seen in FIG. 5, the channels 20d are connected to the ring forming the chamber 20b by connection pieces 20e located on the inner periphery of this ring, while the conduits 21d are connected to the ring forming the chamber 21b by connection pieces 21e located on the outer periphery of this ring (FIG. 5).

As mentioned hereinabove, the outlets 21c of the distributor 13 are connected to cores 22 which shall now be described in reference to FIGS. 8 to 13.

The function of the cores 22 is to lubricate and cool the axes 10*b* of the planets 8 which are here centered and guided by the bearings 11 with rollers IIa.

In the embodiments shown, each axis 10*b* is guided by a bearing 11 with a double bearing, i.e. with a double row of rollers 11*a*. The two rows extend around the same axis which coincides with the one, noted as Y, of the axis 10*b* of the planet 8.

Conventionally, the rollers are guided in tracks defined by inner and outer rings. In the examples shown, a particularity is linked to the fact that the inner guiding rings of the rollers 11*a* are integrated into the axis 10*b*. The external periphery of the axis 10*b* thus comprises cylindrical tracks 11*b* for rolling of the rollers 11*a*, with each track 11*b* being delimited axially by annular ribs 11*c* which are used to guide cages 11*d* for maintaining rollers 11*a*. Moreover, FIG. 3 makes it possible to see that the outer rings are integrated into the inner periphery of the planets 8. The inner periphery of the planets 8 thus comprises cylindrical tracks 8*a* for the rolling of rollers 11*a*, with the tracks 8*a* being separated from another by an annular groove 8*b* opening radially inwards and at the bottom of which are formed radial drill holes 8*c* for the passage of oil.

The outer periphery of each planet 8 comprises double helix gear teeth 8*d*, i.e. two coaxial and adjacent helices which are here separated from one another by an annular groove 8*e* that radially opens outwards and at the bottom of which the drill holes 8*c* open.

The inner periphery of the axis 10*b* of each planet 8 has a general biconical shape and comprises two internal tapered surfaces 10*e*, 10*f* flared in opposite axial directions. The front internal tapered surface 10*e* is thus flared towards the front and the rear internal tapered surface 10*f* is flared towards the rear. In the example shown, a cylindrical surface 10*g* is located between the tapered surfaces 10*e*, 10*f*; a front outer cylindrical surface 10*h* extends between the front end of the axis 10*b* and the front end of the surface 10*e*, and a rear inner cylindrical surface 10*i* extends between the rear end of the axis 10*b* and the rear end of this axis 10*b*.

Orifices 10*d* for the passage of oil pass through the axes 10*b* in the radial direction, and therefore extend between their inner and outer peripheries. In the example shown, they extend between the tapered surfaces 10*e*, 10*f*, on the one hand, and the tracks 11*b* and the outer peripheries of the ribs 11*c*, on the other hand.

An annular flange 10*ga* for the fastening of the core 22 extends radially inwards from the cylindrical surface 10*g*. This flange 10*ga* comprises axial orifices for the passage of screws 30.

In the first embodiment of the core 22 shown in FIGS. 8 to 11, this core 22 comprises two annular, coaxial and substantially tapered flanges 22*a*, 22*b* each comprising a first end of greater diameter and a second opposite end of smaller diameter. The respectively front 22*a* and rear 22*b* flanges, are fastened together by their second ends. As with the surfaces 10*e*, 10*f*, the flanges 22*a*, 22*b* therefore flare in opposite axial directions.

The flanges 22*a*, 22*b* are mounted adjusted inside the axis 10*b* and are configured to cover the tapered surfaces 10*e*, 10*f* in order to define with the latter at least one annular cavity 24 for the circulation of lubricating and cooling oil of the axis 10*b*. In the example shown, these cavities 24 number two which are separated from one another by the flange 10*ga*.

The ends of the flanges 22*a*, 22*b* each comprise an outer cylindrical surface for centering comprising an annular keyway for receiving a seal 25*a*. The front flange 22*a* comprises an upstream end mounted adjusted by the outer cylindrical surface thereof on the surface 10*h*, and a downstream end mounted adjusted by the outer cylindrical surface thereof on the surface 10*g*, before the flange 10*ga*. The rear flange 22*b* comprises an upstream end mounted adjusted by the outer cylindrical surface thereof on the surface 10*h*, at the rear of the flange 10*ga*, and a downstream end mounted adjusted by the outer cylindrical surface therefore of the surface 10*i*.

It is observed in FIG. 8 that the orifices 10*d* open radially inside in the cavities 24. It is also observed that the flanges 22*a*, 22*b* include means of fluidic connection (e.g., a conduit or channel) of the cavities 24 to the distributor 13 described hereinabove.

The rear flange 22*b* here comprises an inner chamber 26 centered on the Y axis and connected on the one hand by radial passages 27 formed in this flange to the cavity 24 delimited by this flange and the surface 10*f*. This flange 22*b* further comprises a connection pipe 25 centered on the Y axis of which one end opens into the chamber 26 and of which the opposite end oriented towards the rear forms a male coupling configured to receive by press-fitting one of the female couplings 21*ca* of an outlet 21*c* of the distributor 13. Alternatively, the pipe 25 could form a female coupling.

The rear flange 22*b* is mounted adjusted in the axis 10*b* by axial translation from the rear to its front end which is axially bearing against the flange 10*ga*. The flange 22*b* comprises at its front end another connection pipe 23 centered on the Y axis, which defines a front end portion of the chamber 26 and which is configured to axially pass through the flange 10*ga*, at its middle, for the purpose of connecting the chamber 26 to an inner chamber 28 of the front flange 22*a*. The chamber 26 thus extends between the tube 25 and the chamber 28, with the latter being connected to the cavity 24 formed between the flange 22*a* and the surface 10*e* by drill holes 29 formed in this flange.

The drill holes 27, 29 of each flange 22*a*, 22*b* number three (this number can vary between 1 and more) and regularly distributed around the Y axis (FIG. 10). In the example, they have the same number of screws. The number depends mainly on the radial place that remains after or before the installation of the screws. The flanges 22*a*, 22*b* each further comprise orifices for the passing of the screwing of fastening screws 30 between them and the flange 10*ga*. The orifices of the flanges are aligned together and with those of the flange 10*ga* and the screws 30 are screwed from the rear through, in order, an orifice of the flange 22*b*, an orifice aligned with the flange 10*ga* and an orifice of the flange 22*a* (cf. FIG. 8).

FIG. 11 shows the flow of oil from the distributor 13 to the rollers 11*a* and to the cage 11*d*, for the purpose of lubricating the rollers and the cage but also the cooling of the axis 10*b*. The oil penetrates into the distributor 13 via its inlet 21*a* and feeds the chamber 21*b* then circulates to the outlets 21*c*. The oil penetrates into the chamber 26 by the pipe 25 then into the chamber 28 by the pipe 23. The chambers 26 and 28 make it possible to slow down the oil (and to prevent a Venturi effect in line with the drill holes 27, 29) and to distribute the oil between the front and rear flanges better. The oil then circulates in the drill holes 27, 29 in order to feed the cavities 24. The oil flows axially along surfaces, from the rear to the front on the surface 10*e*, due to the fact that the drill holes 29 open at the rear end of the front cavity 24, and from the front to the rear on the surface 10*f*, due to the fact that the drill holes 27 open at the front end of the rear cavity 24. The oil then circulated in the orifices 10*d* in order to reach the tracks 11*b* and the ribs 11*c* for the purpose of lubricating the rollers IIa and cages 11d. The oil is conveyed "cold" by the distributor 13. It circulates in the axis 10b which is hot and is therefore heated. It thus arrives at a good temperature for an optimum yield of lubrication on the bearing while still having removed the heat generated. The quantity of heat taken by the oil depends, for example, on the shape of the flanges 22a, 22b.

The radial thickness or dimension of the cavity 24 is chosen according to the expected increase in the temperature of the oil configured to circulate in this cavity, for example between 10° C. and 60° C. The temperature of the oil at the outlet of the orifices 10d is also according to the angle of inclination of the tapered surfaces 10e, 10f and of the flanges 22a, 22b, with respect to the axis Y.

FIGS. 12 and 13 show an alternative embodiment of the core which is designated by the reference 122. Its characteristics are designated by the same reference figures as those of the core 22, increase by one hundred. The preceding description in relation with the core 22 applies to this alternative in that it does not contradict what follows.

The core 122 differs from the preceding embodiment in that the flanges 122a, 122b define a single annular cavity 124 with the inner periphery of the axis 110b. This axis 110b does not include here any inner cylindrical surface between the tapered surfaces 110e, 110f thereof. The ends of smaller diameter of the tapered surfaces 110e, 110f are thus directly connected to one another. The inner periphery of the axis 110b does not have a flange 10ga of the aforementioned type. The cavity 124 has a general "diabolo" shape. It can also be observed that the radial thickness of this cavity 124 is less than that in the preceding embodiment. The orifices 110d for the passage of oil are distributed in annular rows and each row of orifices opens into the cavity 124, in the bottom of a radially internal annular groove formed on the surface 110e, 110f.

The chamber 126 of the rear flange 122b is in fluidic communication with the tube 125 and with radial drill holes 127 that open into the cavity 124. This chamber 126 is here closed at its front end. The chamber 126 is therefore formed in the rear flange 122b (e.g., only in the rear flange). The drill holes 127 can also be formed in the rear flange 122b (e.g., only in the rear flange) or formed in this flange 122b and axially closed by the front flange 122a.

The rear flange 122b comprises a central cylindrical extension 131 towards the front that comprises an external thread and which passes through a central orifice of the front flange 122a. This extension 131 receives a nut 132 screwed from the front that bears axially on the front flange, for the purpose of tightening the whole. Due to the absence of the flange 10ga of the preceding embodiment, the flanges 122a, 122b are fastened to one another (e.g., only to one another) and are maintained in position inside the axis 110b solely by the mounting adjusted of the flanges on the inner periphery of the axis 110b. The tightening of the nut 132 generates an axial tightening of the inner periphery of the axis 110b between the flanges 122a, 122b due to the complementarity of shapes.

As can be seen in the drawings, the ends of larger diameter of the flanges can furthermore be tightened axially against cylindrical shoulders 133 of the inner periphery of the axis 110b, during the tightening of the nut 132.

FIG. 13 shows the flow of the oil from the distributor 113 to the rollers 111a, for the purpose of lubricating rollers but also the cooling of the axis 110b. The oil penetrates into the distributor 113 as indicated hereinabove then penetrates into the chamber 126 by a bushing 137 engaged in the pipe 125. The bushing 137 is a connection bushing similar to the bushings 37 and of which the length is adjusted according to need. The number of bushings 137 is equal to the number of conduits 21d and makes it possible to take up the misalignment and to have a mounting that is less hyperstatic of the distributor 113 on the reduction gear. The oil then circulates in the drill holes 127 in order to feed the cavity 124, substantially at its middle. The oil flows axially along surfaces 110e, 110f, from the center of the cavity towards the rear and towards the front. The oil then circulates in the orifices 110d in order to reach the tracks 111b and the ribs 111c for the purpose of lubricating the rollers 111a and the cage 111d.

FIGS. 14 to 17 show an embodiment of a deflector 18. As mentioned hereinabove, the reduction gear 6 comprises several deflectors 18 which are housed in the cage 14 and are each arranged between two adjacent planets 8. The number of deflectors 18 of the reduction gear 6 is therefore equal to the number of planets 8 of this reduction gear.

The first function of a deflector 18 is to guide the lubrication oil of the gear teeth of the planets 8 and to prevent the recirculation of oil between planets, giving the notion of "inter-planet deflector". The deflectors 18 are thus shaped to hug the peripheral shape of the planets 8.

As can be seen in FIGS. 4 and 15, in addition to extending between two adjacent planets 8, each deflector 18 is located between the sun 7 on the one hand, located radially inside, and a pair of yokes 14c, 14d, on the other hand, located radially outside.

Each deflector 18 comprises a block comprising a first lateral surface 18a that is cylindrical and concave and that has a radius of curvature R1 measured from an axis G1, which coincides with the axis Y of rotation of a planet 8 (FIG. 15). The block comprises a second lateral surface 18b, opposite the first surface 18a, that is cylindrical and concave and that has a radius of curvature R1 measured from an axis G2 that is parallel to G1, and which coincides with the axis Y of rotation of another planet 8.

Each one of the first and second surfaces 18a, 18b comprises a protruding tab 34 that has a general elongated shape about the axis G1, G2 of the surface considered and of which the internal periphery is concavely curved and a radius of curvature R2 measured from this axis G1, G2 which is less than R1. The tabs 34 of a deflector 18 extend substantially in the same plane perpendicular to the axis X and may be located at the middle of the respective surfaces 18a, 18b (in the axial direction).

The surfaces 18a, 18b and the tabs 34 extend around the respective axes G1, G2 over an angular range between 30 and 80° in our example, and may be as large as possible.

In the example shown and as can be seen in FIGS. 14 and 15, the longitudinal ends of the tabs 34 are retracted in relation to planes that pass respectively through the faces 18e, 18f of the deflector 18.

In the alternative shown in FIG. 23, the longitudinal ends 34a of the tabs 34 could pass through such planes and thus be protruding with the purpose of extending the length of the tabs and therefore the circumferential dimension for guiding the oil around the planets 8. In this latter case, the tab 34 would exceed the side of the face 18f where the streams 36cb (sun side) are located and the other side of the yokes 14c, 14d and of the finger 15a. In the solution of FIGS. 14a and 15, the tab covers about 2×45° of the circumference of a planet (two times, because there are two deflectors on either side). If the tab is extended as can be seen in FIG. 14b, outside of the deflector in such a way that it does not touch the sun during mounting and that it does not exit from the circumference of the cage, the tab could cover about 2×75° of overlapping over 360° of the planet.

The block of each deflector 18 further comprises a flat front face 18c, which is substantially radial when the deflector is mounted in the cage 14 of the reduction gear, and a flat rear face 18d, which is also substantially radial. The block further comprises an upper flat face 18e (or radially external), which is configured to be oriented on the side of the pair of yokes 14c, 14d, and a lower face 18f (or radially internal), which is configured to be oriented on the side of the sun 7. This face 18f is cylindrical and concave and has a radius of curvature R3 measured from an axis G3, which coincides with the axis X of the sun. This face 18f therefore has functions to guide the lubrication oil of the gear teeth of the sun.

The deflectors 18 extend between the radial walls 14a, 14b of the cage 14 and have their faces 18a, 18b which are bearing on the inner faces facing these walls 14a, 14b. The deflectors 18 are fastened to the cage 14 by screws 35 for example. Each block can comprise, for example on its rear face 18d, threaded holes for receiving screws 35 for fixing the deflector at the rear wall 14b of the cage 14. An identical configuration on the wall 14a is also possible.

As can be seen in FIG. 4, the threaded holes of each deflector 18 are located substantially in the middle of the radial height or dimension of the deflector, and the screws 35 screwed into these holes pass through orifices of the wall 14b which are located in the vicinity of the radially internal peripheral edge 14ba of this wall 14b (FIGS. 3 and 4). It is thus understood that in mounted position each deflector 18 has a lower portion that extends radially inwards of the peripheral edge 14ba, between this peripheral edge 14ba and the sun 7.

It is further observed in FIG. 16 that in the mounted position, the tabs 34 of each deflector 18 extend to the middle and inside inter-helical grooves 8e of the two planets 8 between which this deflector is mounted. A predetermined clearance J is left between the top of each tab 34 and the bottom facing the groove 8e in which the tab is inserted. The tab 34 has a thickness Ep or axial dimension that represents about 10 to 90% of the axial dimension of the groove 8e. The groove 8e of a planet has a radius R4 measured from the axis Y of the planet and its gear teeth have an outer radius R5 measured from the same axis. The radius R2 is between R4 and R5 and the aforementioned clearance J is equal to the difference between R2 and R4 (FIGS. 15 and 16). This clearance J may be as small as possible in order to optimise the function of the tab 34 of "inter-helical deflector". The tabs 34 function to limit the passage of oil from one gear teething to another gear teething of the same planet 8.

Each deflector 18 comprises an integrated lubrication circuit, which comprises an oil inlet 36a connected by drill holes 36b to at least one oil outlet 36c. In the example shown, the oil inlet 36a is located on the rear face 18d and comprises a pipe configured to form a male coupling and to cooperate by male-female press-fitting with an outlet 20c of the distributor 13 described hereinabove. Although a coupling is presented in what follows as male and configured to cooperate with a female coupling, it can alternatively be replaced with a female coupling configured therefore to cooperate with a male coupling, and conversely (FIG. 3).

Each deflector 18 comprises at least one outlet 36c which has the form of an orifice 36ca that forms a female coupling which is configured to receive a sealed fluidic connection bushing 37 (FIG. 3). As with the inlet 36a, the bushing 37 can be omitted and replaced with a male coupling. This orifice 36ca is located here on the upper face 18e of each deflector. FIG. 3 makes it possible to see that half of the bushing 37 is engaged by male-female press-fitting in the orifice 36ca and that the other half is engaged by male-female press-fitting in a female orifice provided at the radially internal end of the body 17a of the pin 17 carried by a pair of yokes 14c, 14d. This same FIGURE shows that the inlet 36a is connected by two drill holes 36b1, 36b2 to the outlet 36c. These drill holes are perpendicular, a first 36b1 extending along the X axis, from the inlet 36a, and a second 36b2 extending radially from the first drill hole to the orifice 36ca.

The surfaces 18a, 18b are each connected to the face 18f by a truncated edge on which are formed orifices 36cb for spraying oil onto the meshing zones of the sun 7 with the planets 8. These orifices 36cb are connected by inner channels 36b4 to the block, to the axial drill hole 36b1 (FIGS. 3 and 14). FIG. 15 shows the trajectories 36cb1 of the streams of oil sprayed by the orifices 36cb of a deflector 18.

One of the deflectors 18 comprises a nozzle 38 configured to spray lubrication oil onto the splines 7a of the sun 7. This deflector 18 is the one shown in FIG. 14 and at the center in FIG. 15. The nozzle 38 is formed in a single piece with the block of the deflector 18 and here has a general L shape of which one branch 38a has a radial orientation and of which one branch 38b extends axially and connects the front face 18c of the block to the radially external end of the branch 38a. The nozzle 38 extends in a median plane of symmetry of the block. The deflectors 18 that do not comprise a nozzle 38 also have a median plane of symmetry, which corresponds to a plane passing through the axis X of the reduction gear 6.

The branch 38a extends radially inwards from the branch 38b and its radially internal free end comprises an orifice 36cc oriented towards the rear for spraying oil onto the splines 7a. FIG. 17 shows the stream of oil 39 sprayed by this nozzle 38.

The feeding with oil of the nozzle 38 is carried out by extending the axial drill hole 36b1 that can be seen in FIG. 3 until the front face 18c of the block of the deflector 18, and in the axial branch 38b (FIG. 14). An additional radial drill hole 36b3 is carried out in the branch 38 in order to connect this axial drill hole 36b to the orifice 36cc for spraying oil from the nozzle. The radially external end of the drill hole 36b3 of the nozzle, which is therefore opposite the orifice 36cc for spraying oil, can be closed by an added plug 36d (FIG. 14). As can be seen in FIG. 3, the deflectors 18 that do not comprise a nozzle 38 have a shorted axial drill hole 36b, i.e. that does not open onto the front face 18c of the block of the deflector.

FIGS. 17 and 18 make it possible to see that the radially internal peripheral edge 14aa of the front radial wall 14a comprises notches 40 that are regularly spaced around the axis X in order to facilitate the mounting of the deflectors and the one comprising the nozzle 38. This peripheral edge 14aa thus has a general star shape. The number of notches 40 is equal to the number of deflectors 18 and therefore to the number of planets 8. The minimum number of notches 40 is equal to the number of nozzles 38 which is a single one in the example shown. But, in order to gain in mass and to have a more regular/periodic shape, it is more advantageous to have the maximum number which is the number of planets 8 or deflectors 18. The interest in using a single notch would be to need to have to render the mounting foolproof so that it is not possible to mount the deflector nozzle in one of the five positions that would not be intended for it.

FIGS. 19 to 22 show the steps of mounting the reduction gear 6 and of the deflectors 18, of the sun 7, of the planets 8 and of their axes 10b. A first step includes arranging the deflectors 18 in the cage 14 which is already fastened to the cage carrier 15. The deflectors are inserted one after the other into the cage, through the central orifice of the front wall 14a then are displaced radially outwards one after the other in order to be positioned in such a way that their threaded holes are aligned with the orifices for the passing of the screws 35 of the rear wall 14b (FIG. 19). Mounting them by sliding them through the holes 16 is also possible. These screws 35 are then screwed and tightened in order to fasten the deflectors 18 to the cage 14 (FIG. 20). The sun 7 is then inserted into the cage 14 via axial translation from the rear, through the central orifice of the rear wall 14b (FIG. 20). The planets 8 are then engaged one after the other in the cage 14, via translation in the radial direction through the mounting holes 16 located between the pairs of yokes 14c, 14d (FIG. 21). The axes 10b of the planets 8 are then inserted into their respective planets via axial translation from upstream, through openings provided for this purpose on the front radial wall 14a (FIG. 22). A nut 41 is screwed onto the rear end of each axis 10b and axially bears against the rear wall 14b in order to maintain the axes of the planets in the cage 14 (FIGS. 3, 4 and 22).

While illustrative embodiments have been illustrated and described, it will be appreciated that various changes can be made therein without departing from the spirit and scope of the claimed subject matter.

The embodiments of the invention in which an exclusive property or privilege is claimed are defined as follows:

1. A deflector for a mechanical reduction gear of a turbine engine, the deflector being configured to be inserted between two adjacent planets of the mechanical reduction gear, the deflector comprising:
   a block having:
      a first lateral surface that is cylindrical and concave and having a radius of curvature R1 measured from an axis G1; and
      a second lateral surface, opposite the first lateral surface, that is cylindrical and concave and having a radius of curvature R1 measured from an axis G2 that is parallel to G1,
   wherein each of the first and second lateral surfaces has at least one protruding tab that has a generally elongate shape about the axis G1, G2, respectively, and has an internal periphery that is concavely curved and a has radius of curvature R2 measured from the respective axis G1, G2, the radius of curvature R2 being less than R1.

2. The deflector according to claim 1, wherein the at least one protruding tab of each of the first and second lateral surfaces has a single protruding tab disposed in a middle of the first or second lateral surface, respectively.

3. The deflector according to claim 1, further comprising a plurality of threaded holes configured to receive screws for fixing the deflector to a planet carrier of the mechanical reduction gear.

4. The deflector according to claim 1, further comprising an integrated lubrication circuit.

5. The deflector according to claim 4, wherein the integrated lubrication circuit has an oil inlet connected by a plurality of drill holes to at least one oil outlet.

6. The deflector according to claim 5, wherein the at least one oil inlet has a male-female press-fitting connection pipe.

7. The deflector according to claim 5, further comprising an oil outlet configured to receive a sealed fluidic connection bushing.

8. The deflector according to claim 5, further comprising an oil outlet formed by a nozzle formed in a single part with the block, the nozzle having an elongate shape and extending in a median plane of symmetry of the block.

9. The deflector according to claim 1, wherein the at least one protruding tab of each of the first and second lateral surfaces has a radial thickness, measured with respect to the axis G1, G2, respectively, which is substantially constant.

10. A planet carrier for a mechanical reduction gear of a turbine engine, the planet carrier comprising:
   a cage defining a housing configured to receive a central sun of axis X of rotation;
   a plurality of planets arranged about the sun, each planet having a double helix gear teeth; and
   a plurality of deflectors according to claim 1, which are each fixed to the cage and inserted between two adjacent planets of the plurality of planets in such a way that the at least one protruding tab of the first and second lateral surfaces is engaged in inter-helical grooves of the double helix gear teeth of the planets.

11. The planet carrier according to claim 10, wherein one of the plurality of deflectors comprises a nozzle oriented in a radial direction with respect to the axis X and inwards such that it is configured to spray oil onto a plurality of inner splines of the sun.

* * * * *